US011430154B2

United States Patent
Higa

(10) Patent No.: US 11,430,154 B2
(45) Date of Patent: Aug. 30, 2022

(54) CLASSIFICATION OF CHANGE RELATED TO DISPLAY RACK

(71) Applicant: NEC Corporation, Tokyo (JP)

(72) Inventor: Kyota Higa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 236 days.

(21) Appl. No.: 16/491,656

(22) PCT Filed: Mar. 31, 2017

(86) PCT No.: PCT/JP2017/013675
§ 371 (c)(1),
(2) Date: Sep. 6, 2019

(87) PCT Pub. No.: WO2018/179360
PCT Pub. Date: Oct. 4, 2018

(65) Prior Publication Data
US 2020/0005492 A1   Jan. 2, 2020

(51) Int. Cl.
*G06K 9/00* (2022.01)
*G06T 7/00* (2017.01)
(Continued)

(52) U.S. Cl.
CPC ............. *G06T 7/97* (2017.01); *G06N 20/00* (2019.01); *G06T 7/20* (2013.01); *G06T 7/50* (2017.01);
(Continued)

(58) Field of Classification Search
CPC .... G06T 7/97; G06T 7/50; G06T 7/20; G06T 2207/10024; G06T 2207/10028;
(Continued)

(56) References Cited

U.S. PATENT DOCUMENTS 7,590,261 B1 *   9/2009   Mariano ............ G06K 9/00785
                                                                    382/103
2014/0152874 A1 *   6/2014   Clayton ................. H04N 5/272
                                                                    348/239
(Continued)

FOREIGN PATENT DOCUMENTS

JP           1084525 A      3/1998
JP        2001088912 A      4/2001
(Continued)

OTHER PUBLICATIONS

Japanese Office Action for JP Application No. 2019-508129 dated Jun. 9, 2020 with English Translation.
(Continued)

*Primary Examiner* — Andrew M Moyer

(57) ABSTRACT

A state of a display rack is determined more accurately. An image processing device includes a detection unit configured to detect a change area related to a display rack from a captured image in which an image of the display rack is captured, and a classification unit configured to classify a change related to the display rack in the change area, based on a previously learned model of the change related to the display rack or distance information indicating an image captured before an image capturing time of the captured image.

15 Claims, 26 Drawing Sheets

(51) Int. Cl.
*G06T 7/50* (2017.01)
*G06N 20/00* (2019.01)
*G06T 7/20* (2017.01)

(52) U.S. Cl.
CPC .............. *G06T 2207/10024* (2013.01); *G06T 2207/10028* (2013.01); *G06T 2207/20081* (2013.01); *G06T 2207/30242* (2013.01)

(58) Field of Classification Search
CPC . G06T 2207/20081; G06T 2207/30242; G06T 7/194; G06T 7/11; G06T 2207/30232; G06T 7/254; G06N 20/00; G06N 3/0454; G06K 9/00771; G06K 9/00765
USPC .......................................................... 382/103
See application file for complete search history.

(56) References Cited

U.S. PATENT DOCUMENTS

| | | | |
|---|---|---|---|
| 2014/0369607 A1 | 12/2014 | Patel et al. | |
| 2015/0052029 A1* | 2/2015 | Wu | G06Q 30/0201 705/7.29 |
| 2016/0203499 A1* | 7/2016 | Yamashita | G06Q 30/0201 705/7.29 |
| 2017/0083884 A1* | 3/2017 | Vilmosh | G06K 9/6202 |
| 2018/0089613 A1* | 3/2018 | Chen | G06T 7/90 |
| 2020/0013169 A1 | 1/2020 | Higa | |

FOREIGN PATENT DOCUMENTS

| | | | | |
|---|---|---|---|---|
| JP | 2005242488 A | | 9/2005 | |
| JP | 2008176504 A | | 7/2008 | |
| JP | 2012133433 A | | 7/2012 | |
| JP | 2013257785 A | | 12/2013 | |
| JP | 2016058105 A | | 4/2016 | |
| JP | 2016207164 A | | 12/2016 | |
| JP | 2017033256 A | | 2/2017 | |
| WO | WO-2015033577 | * | 3/2015 | ............. G06Q 30/02 |
| WO | 2018/179361 A1 | | 10/2018 | |

OTHER PUBLICATIONS

Zoran Zivkovic, "Improved Adaptive Gaussian Mixture Model for Background Subtraction", Proceedings of the 17th International Conference on Pattern Recognition, (ICPR '04), U.S.A., IEEE Computer Society, Aug. 2004, vol. 2, pp. 28-31 ( 4 pages total).
Written Opinion of the International Searching Authority dated May 30, 2017, in International Application No. PCT/JP2017/013675.
International Search Report dated May 30, 2017, in International Application No. PCT/JP2017/013675.

* cited by examiner

Fig.6

60 CLASSIFICATION RESULT

| SECOND IMAGE OF INTEREST | FIRST IMAGE OF INTEREST | CHANGE TYPE |
|---|---|---|
| 61 | 62 | 63 |
|  |  | CHANGE DUE TO GOODS BEING NEWLY INCLUDED ON DISPLAY RACK |
|  |  | CHANGE DUE TO GOODS BEING NO LONGER INCLUDED ON DISPLAY RACK |
|  |  | CHANGE DUE TO CHANGE IN APPEARANCE OF GOODS DISPLAYED ON DISPLAY RACK |

251 OUTPUT SCREEN

261 OUTPUT SCREEN

CLASSIFICATION OF CHANGE RELATED TO DISPLAY RACK

This application is a National Stage Entry of PCT/JP2017/013675 filed on Mar. 31, 2017, the contents of all of which are incorporated herein by reference, in their entirety.

TECHNICAL FIELD

The present disclosure relates to an image processing device, an image processing method, and a recording medium.

BACKGROUND ART

When there is a deficiency in a display state of goods displayed on a display rack at a store such as a convenience store or a supermarket, that is, for example, when there is a shortage of a goods displayed on the display rack, a sales opportunity loss occurs, and sales at the store is heavily affected. Accordingly, when there is a deficiency in a display state of goods, it is preferable that goods replenishment work or the like for eliminating the deficiency be promptly performed. Thus, monitoring of a display state of goods displayed on a display rack has been sought.

For example, a device causing a clerk or the like to grasp work items for the state monitoring area by evaluating a display state by use of a plurality of evaluation indicators related to disturbed display of goods in a state monitoring area and presenting information about an evaluation result to the clerk is described (PTL 1).

Further, a background subtraction method of detecting a foreground area, based on background information of a photographed image, is described in PTL 2 and NPL 1.

CITATION LIST

Patent Literature

[PTL 1] Japanese Unexamined Patent Application Publication No. 2016-207164
[PTL 2] Japanese Unexamined Patent Application Publication No. 2008-176504

Non Patent Literature

[NPL 1] Zoran Zivkovic, "Improved Adaptive Gaussian Mixture Model for Background Subtraction," Proceedings of the 17th International Conference on Pattern Recognition (ICPR 2004), U.S.A., IEEE Computer Society, August, 2004, Volume 2, pp. 28 to 31

SUMMARY OF INVENTION

Technical Problem

When monitoring a display rack, it is considered greatly useful for acquisition of sales opportunities to specify a type of change at the display rack, such as a change due to a goods being taken by a customer, a change due to a goods being replenished by a clerk, or a change in a shape or appearance due to a customer taking a goods in his/her hand and returning the goods to the original position. However, the technology described in PTL 1 is limited to causing a clerk to grasp disturbed display of goods.

An object of the present disclosure is to provide a technology of more accurately determining a state of a display rack.

Solution to Problem

An image processing device according to an aspect of the present disclosure includes a detection means configured to detect a change area related to a display rack from a captured image in which an image of the display rack is captured, and a classification means configured to classify a change related to the display rack in the change area, based on a previously learned model of the change related to the display rack or distance information indicating an image captured before an image capturing time of the captured image.

Further, an image processing method according to an aspect of the present disclosure includes detecting a change area related to a display rack from a captured image in which an image of the display rack is captured, and classifying a change related to the display rack in the change area, based on a previously learned model of the change related to the display rack or distance information indicating an image captured before an image capturing time of the captured image.

A computer program providing the aforementioned device or method by a computer and a computer-readable non-transitory recording medium storing the computer program also fall under the category of the present disclosure.

Advantageous Effects of Invention

The present disclosure is able to more accurately determine a state of a display rack.

BRIEF DESCRIPTION OF DRAWINGS

FIG. 6 shows a diagram illustrating an example of a classification result output by a area change classification unit.

EXAMPLE EMBODIMENT

<First Example Embodiment>

Figure 1:
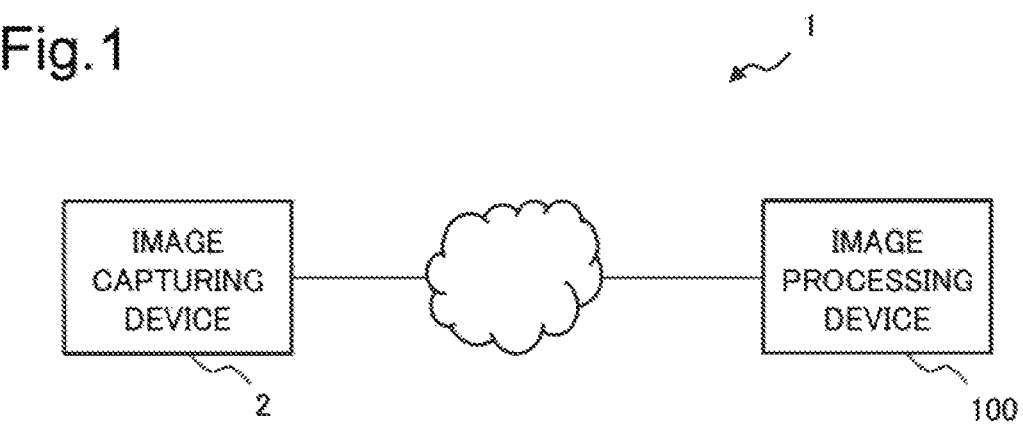
FIG. 1 shows a diagram illustrating a configuration example of a goods monitoring system including an image processing device according to a first example embodiment.
Figure 2:
FIG. 2 shows a diagram for illustrating a use scene of the goods monitoring system.

A first example embodiment of the present disclosure is described with reference to drawings. FIG. 1 shows a diagram illustrating a configuration example of a goods monitoring system 1 including an image processing device 100 according to the present example embodiment. FIG. 2 shows a diagram for illustrating a use scene of the goods monitoring system 1.

As illustrated in FIG. 1, the goods monitoring system 1 includes the image processing device 100 and an image capturing device 2. The image processing device 100 is communicably connected to the image capturing device 2. While the image processing device 100 is described on an assumption that the image processing device 100 is configured to be separate from the image capturing device 2, according to the present example embodiment, the image processing device 100 may be configured to be built into the image capturing device 2. Further, there may be a plurality of image capturing devices 2. Further, an image captured by the image capturing device 2 may be a dynamic image or a series of static images.

In the goods monitoring system 1, the image capturing device 2 captures an image of a display rack 3 in a store, as illustrated in FIG. 2. Then, the image capturing device 2 transmits an image signal representing the captured image to the image processing device 100. For example, the image capturing device 2 is a monitoring camera installed in the store. The image capturing device 2 may store the captured image inside the image capturing device 2 or in a storage device different from the image processing device 100.

A captured image acquired by the image capturing device 2 is described on an assumption that the captured image is a color image (hereinafter referred to as a red green, blue [RGB] image), according to the present example embodiment. For example, the captured image may be an image in a color space other than an RGB image.

Figure 3:
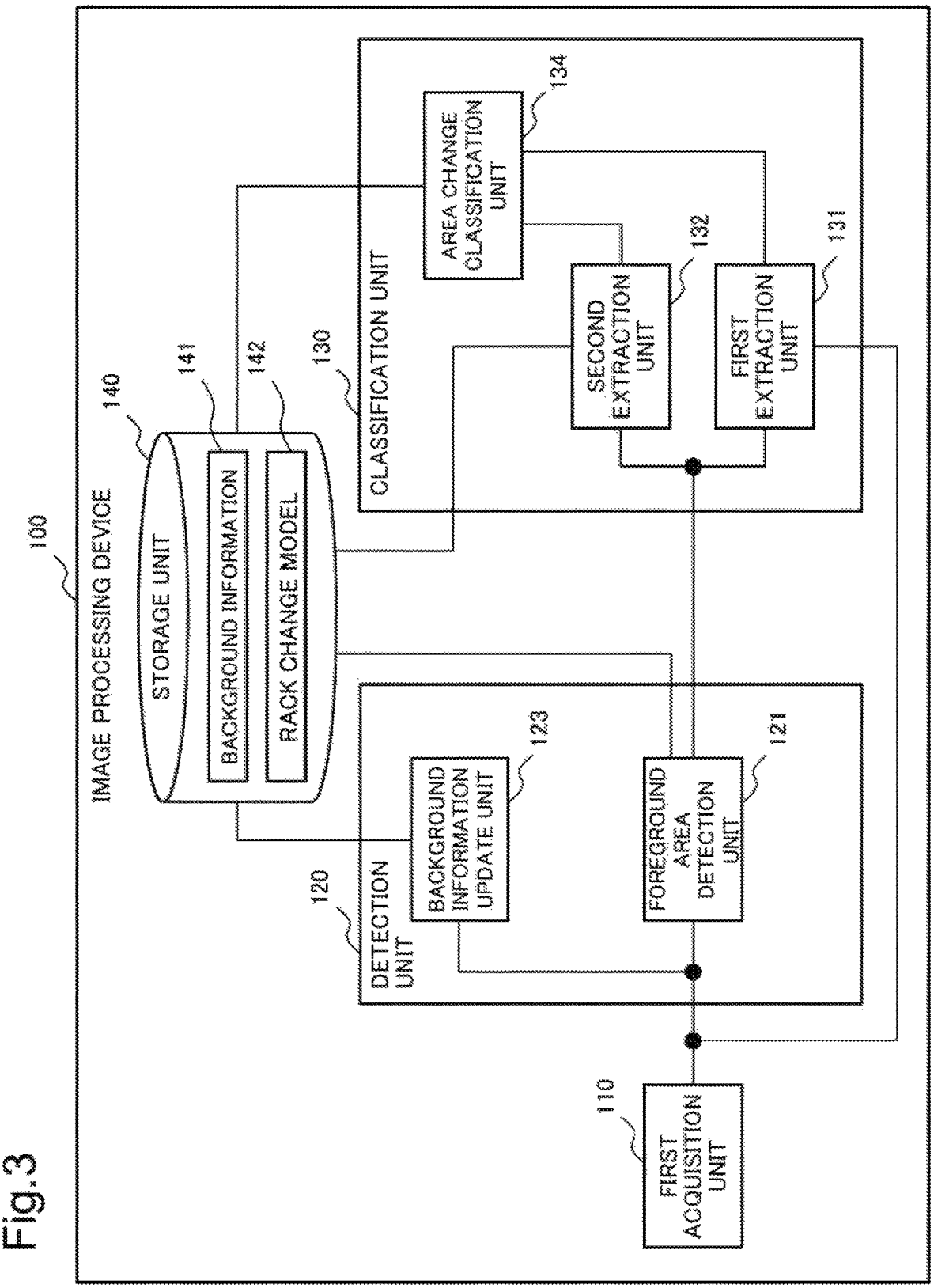
FIG. 3 shows a functional block diagram illustrating an example of a functional configuration of the image processing device according to the first example embodiment.

FIG. 3 shows a functional block diagram illustrating an example of a functional configuration of the image processing device 100 according to the present example embodiment. As illustrated in FIG. 3, the image processing device 100 includes a first acquisition unit 110, a detection unit 120, a classification unit 130, and a storage unit 140. The image processing device 100 illustrated in FIG. 3 illustrates a configuration unique to the present disclosure, and it is needless to say that the image processing device 100 illustrated in FIG. 3 may include a component not illustrated in FIG. 3. This also applies to a second example embodiment and beyond.

The first acquisition unit 110 acquires an image signal representing a captured image acquired by capturing an image of a display rack 3 by the image capturing device 2. The first acquisition unit 110 may receive an image signal transmitted from the image capturing device 2. The first acquisition unit 110 may acquire an image signal converted based on a captured image stored inside the image capturing device 2 or in a storage device different from the image capturing device 2 and the image processing device 100.

When the image processing device 100 is built into the image capturing device 2, the first acquisition unit 110 may be configured to acquire a captured image itself.

The first acquisition unit 110 converts an acquired image signal into an RGB image constituting the image signal and provides the RGB image for the detection unit 120 and the classification unit 130. The RGB image acquired by converting the image signal by the first acquisition unit 110 represents a captured image of the display rack 3 captured by the image capturing device 2 and therefore is also simply referred to as a captured image.

The storage unit 140 stores background information 141 and a rack change model 142. The storage unit 140 may be provided by a storage device different from the image processing device 100 or may be built into the detection unit 120 or the classification unit 130. Further, the background information 141 and the rack change model 142 may be stored in separate storage units.

The background information 141 is a reference image for making a comparison with a captured image in the detection unit 120 and is also referred to as a background image. For example, it is preferable that the background information 141 is the same type of image as the captured image. As described above, a captured image is an RGB image, according to the present example embodiment, and therefore it is preferable that the background information 141 is also an RGB image. The background information 141 may be a captured image provided first for the detection unit 120 from the first acquisition unit 110 or may be a previously given image.

The rack change model 142 is a model modeling a previously learned change in a display rack 3. For example, the rack change model 142 may be acquired by learning by use of machine learning such as a widely known convolutional neural network.

For example, a rack change model 142 represents "a change due to a goods being no longer included on a display rack 3" or "a change due to a goods being newly included on a display rack 3" learned by use of an image in which the display rack 3 includes a goods and an image in which the display rack 3 does not include a goods. Further, a rack change model 142 represents "a change due to a change in appearance of a goods displayed on a display rack 3" learned by use of an image of a plurality of goods and a plurality of images in which a shape of each goods is changed. Further, a rack change model 142 represents "a change due to existence of a person in front of a display rack 3," "a change due to existence of a shopping cart in front of a display rack 3," or the like learned by use of a captured image captured in a state in which no target exists in front of the display rack 3 and a captured image captured in a state in which a target such as a person exists in front of the display rack 3. Further, for example, a rack change model 142 may represent "a change due to a change in lighting" learned by use of images in various environments.

Further, for example, learning data of the rack change model 142 may be a 6-channel image combining two RGB images before and after a change or a 2-channel image combining any one of an R component, a G component, and a B component in each of two RGB images before and after a change. Further, for example, the learning data may be a 4-channel image combining any two of an R component, a G component, and a B component in each of two RGB images before and after a change or a 2-channel image combining two RGB images before and after a change after conversion into gray-scale images. Further, the learning data may be an image combining one or a plurality of channels in a color space after conversion into another color space such as a hue, saturation, and value (HSV) color space, while RGB images before and after a change are converted into the other color space.

Further, the learning data of the rack change model 142 may be generated from a color image such as an RGB image or may be generated by use of both a color image and a distance image.

The detection unit 120 detects a change area related to a display rack 3. For example, when a goods being included in a captured image and being displayed on a display rack 3 is not included in an image (for example, a background image) acquired before the captured image, the detection unit 120 detects a area of the goods. Further, for example, when a goods being included in a background image and being displayed on a display rack 3 is not included in a captured image, the detection unit 120 detects a area of the goods. Further, when a goods being included in a captured image and being displayed on a display rack 3, and the goods included in a background image look differently, the detection unit 120 detects a area of the goods. Further, when a captured image is captured when a person or an object exists between a display rack 3 and the image capturing device 2, the detection unit 120 detects a area of the person or the object included in the captured image in which an image of the display rack 3 is captured. Thus, the detection unit 120 detects a change area related to a display rack 3 such as a change area inside the display rack 3 or a change area in a captured image caused by an object between the display rack 3 and the image capturing device 2.

As illustrated in FIG. 3, the detection unit 120 includes a foreground area detection unit 121 and a background information update unit 123.

The foreground area detection unit 121 receives a captured image provided from the first acquisition unit 110. Further, the foreground area detection unit 121 acquires background information 141 related to the captured image from the storage unit 140. As described above, the background information 141 is an RGB image. The foreground area detection unit 121 compares the two RGB images (the captured image and the background information 141) and detects a area changing between the two RGB images as a change area. It can also be said that the foreground area detection unit 121 detects a foreground area in order to compare background information 141 being a background image with an RGB image being a captured image.

A detection method of a change area by the foreground area detection unit 121 is not particularly limited and may employ an existing technology. For example, the foreground area detection unit 121 may detect a change area by use of the background subtraction method disclosed in NPL 1. The foreground area detection unit 121 may generate a binary image expressing a pixel value of a detected change area as 255 and the remaining area as 0. Consequently, the foreground area detection unit 121 generates a binary image having the same size as a captured image.

The foreground area detection unit 121 provides the generated binary image for the classification unit 130 as a detection result of a change area. At this time, the foreground area detection unit 121 may attach, to the binary image, information indicating a captured image used in generation of the binary image and information indicating the background information 141, and provide the binary image for the classification unit 130 or provide the captured image and the background information 141 for the classification unit 130 along with the binary image.

A detection result has only to include information indicating a detected change area. For example, the foreground area detection unit 121 may associate information indicating a position of a detected change area (a area with a pixel value 255) and a size of the change area with information indicating a captured image and information indicating a background image that are used for detection of the change area, and output the associated information as a detection result. Thus, a detection result output by the foreground area detection unit 121 may take any form.

Based on a captured image provided from the first acquisition unit 110 and an RGB image being background information 141 stored in the storage unit 140, the background information update unit 123 updates the background information 141. An update method of background information 141 by the background information update unit 123 is not particularly limited and may employ, for example, a method similar to NPL 1.

Figure 4:
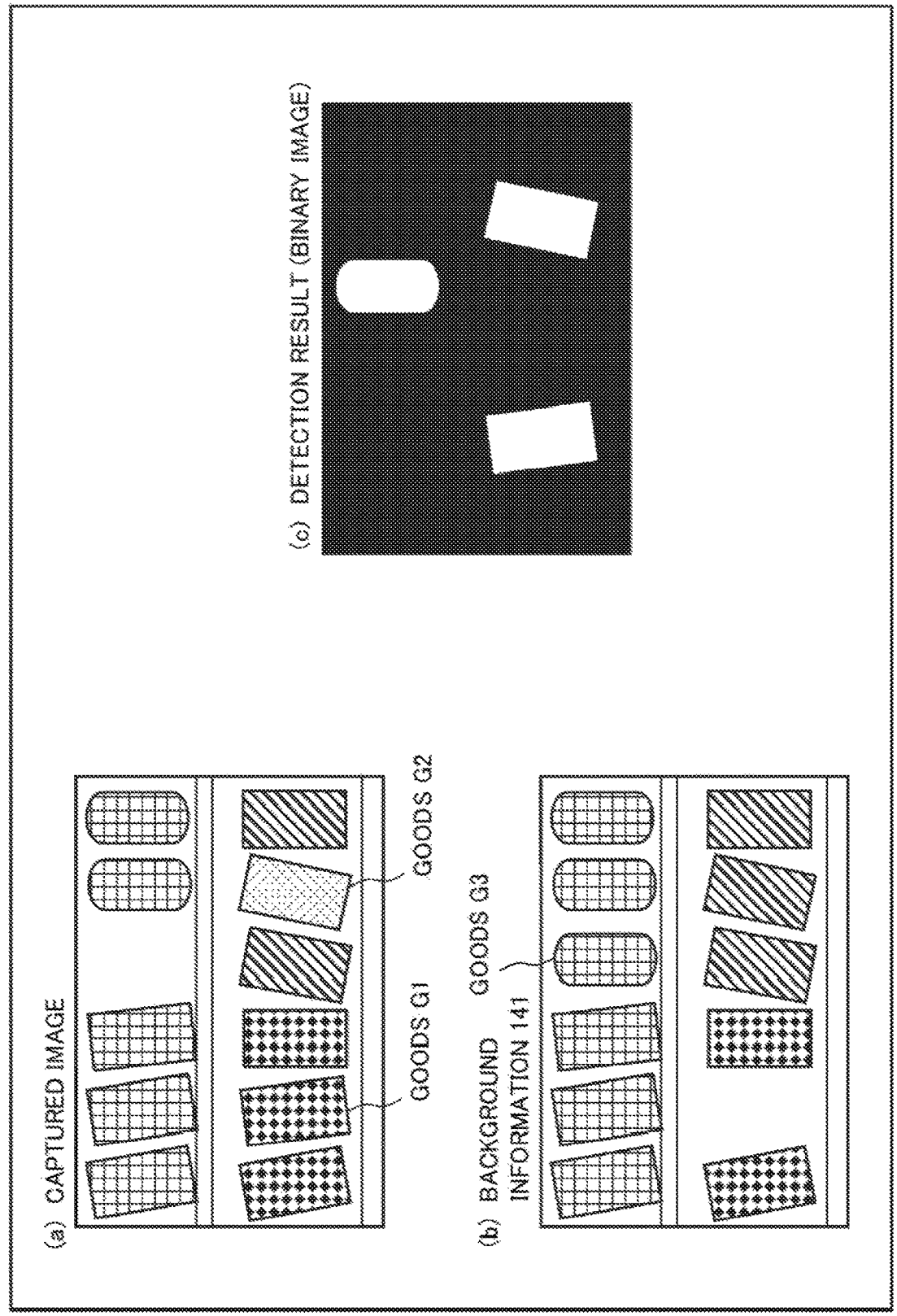
FIG. 4 shows a diagram for illustrating an operation of a detection unit.

An operation of the detection unit 120 is further described with reference to FIG. 4. FIG. 4 shows a diagram for illustrating an operation of the detection unit 120. A diagram (a) in FIG. 4 is an example of a captured image, a diagram (b) in FIG. 4 is an example of background information 141 related to the captured image, the background information 141 being stored in the storage unit 140, and a diagram (c)

in FIG. 4 shows a diagram illustrating an example of a binary image being a detection result of a change area.

The captured image and the background information 141 differ in areas of a goods G1, a goods G2, and a goods G3. The goods G1 is not included in the background information 141 but is included in the captured image. Further, the goods G3 is included in the background information 141 but is not included in the captured image. Further, on the background information 141, another goods is displayed at a position of the goods G2 included in the captured image. Accordingly, the foreground area detection unit 121 also detects the area of the goods G2 as a area undergoing a change. Consequently, the foreground area detection unit 121 generates a binary image in which the parts corresponding to the areas of the goods G1, the goods G2, and the goods G3 are represented in white, and the remaining part is represented in black, as illustrated in the diagram (c) in FIG. 4.

In the following description, a change area refers to each white part in the diagram (c) in FIG. 4. Specifically, for example, a change area is a set of pixels with a pixel value 255, a pixel value of at least one of pixels adjacent to the pixel being 255. In the example in the diagram (c) in FIG. 4, the foreground area detection unit 121 detects three change areas.

As illustrated in FIG. 3, the classification unit 130 includes a first extraction unit 131, a second extraction unit 132, and a area change classification unit 134.

The classification unit 130 classifies a change related to a display rack 3 in a change area. Based on a detection result (binary image) provided from the detection unit 120 and a rack change model 142 stored in the storage unit 140, the classification unit 130 classifies a change from a state of an image of a area corresponding to a detected change area on a background image to a state of an image of a area corresponding to the change area on a captured image. For example, a state of an image includes a state in which a goods is included or not included in an image, a state in which a customer is included or not included in an image, a state in which a shopping basket is included or not included in an image, and a state in which a shopping cart is included or not included in an image. For example, based on a rack change model 142, the classification unit 130 classifies a change related to a display rack 3 in a change area as a change type such as "a change due to a goods being no longer included on a display rack 3," "a change due to a goods being newly included on a display rack 3," "a change due to a change in appearance of a goods displayed on a display rack 3," "a change due to existence of a person in front of a display rack 3," "a change due to existence of a shopping cart in front of a display rack 3," or "a change due to a change in lighting." The types for classifying a state change in a change area by the classification unit 130 are examples and the types are not limited to the above. Further, for example, "a change due to a change in appearance of a goods displayed on a display rack 3" may be classified in more detail into "a change in appearance due to a change to a different goods" and "a change in appearance due to a change in a position of a goods."

Each unit in the classification unit 130 is specifically described. The first extraction unit 131 receives a binary image being a detection result from the foreground area detection unit 121. Further, the first extraction unit 131 acquires a captured image used in generation of the binary image from the storage unit 140. The first extraction unit 131 may receive the captured image from the foreground area detection unit 121 along with the binary image.

The first extraction unit 131 extracts an image of a change area from a captured image. Specifically, by use of a captured image and a binary image having the same size as the captured image, the first extraction unit 131 extracts an image of a area on the captured image corresponding to a area with a pixel value 255 in the binary image as a first image of interest. When the binary image is the diagram (c) in FIG. 4, the first extraction unit 131 extracts three first images of interest from the captured image. As described above, the captured image is an RGB image, and therefore an extracted first image of interest is also an RGB image.

For each change area, the first extraction unit 131 may extract a first image of interest in a area having the same shape as the change area or may extract an image in a area enclosed by an outline having the same shape as an outline in a predetermined shape and being circumscribed on the change area, as a first image of interest. For example, a shape of an outline circumscribed on the change area may be any shape such as a rectangle or an ellipse. Further, the first extraction unit 131 may extract an image of a area enclosed by an outline larger than an outline circumscribed on the change area by a predetermined size, as a first image of interest.

The first extraction unit 131 provides the extracted first image of interest for the area change classification unit 134. A area of a first image of interest extracted by the first extraction unit 131 on a captured image is also referred to as a first area of interest.

The second extraction unit 132 receives a binary image being a detection result, from the foreground area detection unit 121. Further, the second extraction unit 132 acquires background information 141 used in generation of the binary image from the storage unit 140. The second extraction unit 132 may receive the background information 141 from the foreground area detection unit 121 along with the binary image.

The second extraction unit 132 extracts an image of a change area from background information 141. Specifically, by use of background information 141 being a background image and a binary image, the second extraction unit 132 extracts an image of a area on the background information 141 corresponding to a area with a pixel value 255 in the binary image, as a second image of interest. An extraction method of a second image of interest is similar to the extraction method of a first image of interest. The second extraction unit 132 provides the extracted second image of interest for the area change classification unit 134. A area of a second image of interest extracted by the second extraction unit 132 on background information 141 is also referred to as a second area of interest.

The area change classification unit 134 receives a first image of interest from the first extraction unit 131. Further, the area change classification unit 134 receives a second image of interest from the second extraction unit 132. Based on the rack change model 142 stored in the storage unit 140, the area change classification unit 134 classifies a change from a state of a second image of interest to a state of a first image of interest related to the second image of interest as, for example, a type described above. For example, based on a result of comparing a change from a state of a second image of interest to a state of a first image of interest with the rack change model 142, the area change classification unit 134 classifies the change.

For example, the area change classification unit 134 may classify a change related to a display rack 3 as one of the aforementioned types by use of a machine learning method (such as a convolutional neural network) by which the rack change model is created.

The area change classification unit 134 may store the classification result into, for example, the storage unit 140 or may output the result to outside the image processing device 100.

Figure 5:
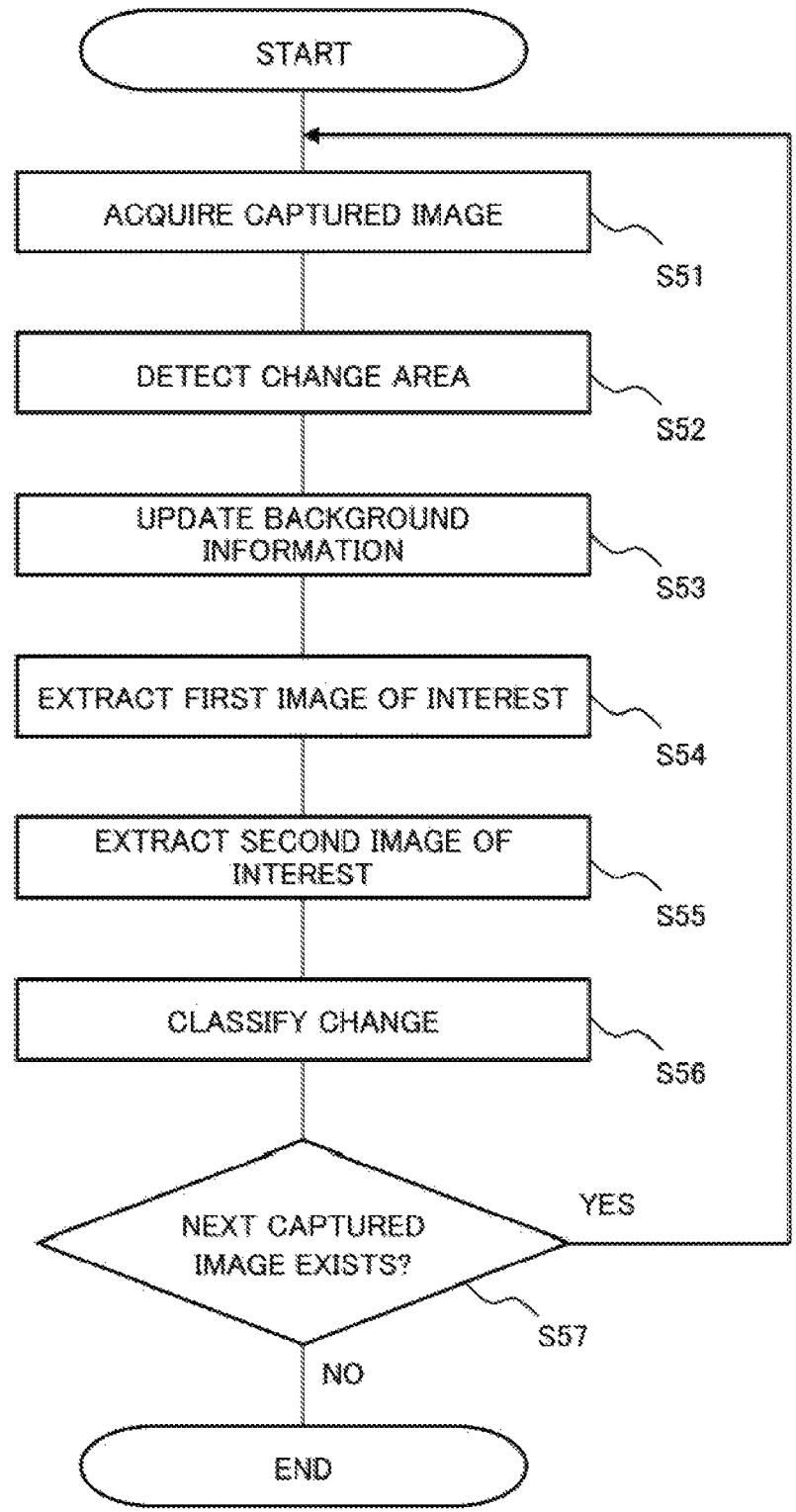
FIG. 5 shows a flowchart illustrating an example of an operation flow in the image processing device according to the first example embodiment.

Next, an operation flow of the image processing device 100 according to the present example embodiment is described with reference to FIG. 5. FIG. 5 shows a flowchart illustrating an example of an operation flow in the image processing device 100 according to the present example embodiment.

First, the first acquisition unit 110 acquires a captured image being an RGB image, from an image signal in which an image of a display rack 3 is captured (Step S51). The first acquisition unit 110 provides the acquired captured image for the detection unit 120 and the classification unit 130.

Next, by use of the captured image being an RGB image provided from the first acquisition unit 110 and background information 141 being an RGB image stored in the storage unit 140, the foreground area detection unit 121 in the detection unit 120 detects a area changing between the two RGB images as a change area (Step S52). Then, the foreground area detection unit 121 provides the detection result of the change area for the classification unit 130. For example, the classification unit 130 generates a binary image in which a pixel in the detected change area is set to 255, and a pixel in the remaining area is set to 0, and provides the binary image for the classification unit 130 as the detection result of the change area.

Further, the background information update unit 123 updates background information 141 by use of the captured image and the background information 141 (Step S53). Step S53 may be performed at any timing after Step S51.

Based on the captured image provided from the first acquisition unit 110 and the detection result related to the captured image, the detection result being provided from the foreground area detection unit 121, the first extraction unit 131 in the classification unit 130 extracts an image of a area (first area of interest) on the captured image corresponding to a change area indicated by the detection result, as a first image of interest (Step S54). The first extraction unit 131 provides the extracted first image of interest for the area change classification unit 134.

Further, based on the detection result provided from the foreground area detection unit 121 and the background information 141 used for acquiring the detection result, the information being acquired from the storage unit 140, the second extraction unit 132 in the classification unit 130 extracts a second image of interest from the background information 141 through an operation similar to that of the first extraction unit 131 (Step S55). The second extraction unit 132 provides the extracted second image of interest for the area change classification unit 134. Step S54 and Step S55 may be performed simultaneously or may be performed in reverse order.

Then, based on the first image of interest provided from the first extraction unit 131, the second image of interest provided from the second extraction unit 132, and the rack change model 142 stored in the storage unit 140, the area change classification unit 134 classifies a change (a change from a state in the second image of interest to a state in the first image of interest) related to the display rack 3 (Step S56).

Then, the image processing device 100 determines whether or not the first acquisition unit 110 receives a next image signal (whether or not a next captured image exists) (Step S57). When a next captured image exists (YES in Step S57), the processing proceeds to Step S51, and when a next captured image does not exist (NO in Step S57), the image processing device 100 ends the operation.

FIG. 6 shows a diagram illustrating an example of a classification result output by the area change classification unit 134 in the classification unit 130. For example, the area change classification unit 134 outputs a classification result 60 as illustrated in FIG. 6.

As illustrated in FIG. 6, the classification result 60 includes a second image of interest 61, a first image of interest 62, and a change type 63. The classification result 60 illustrated in FIG. 6 is an example, and the classification result 60 may include information other than the information described in FIG. 6. For example, the classification result 60 may include information (such as an identifier and an image capturing time) about the captured image and information indicating a position of the first image of interest 62 in the captured image.

As described above, in the image processing device 100 according to the present example embodiment, the detection unit 120 detects a change area related to a display rack 3 by comparing a captured image in which an image of the display rack is captured with background information indicating an image captured before an image capturing time of the captured image, and the classification unit 130 classifies a change related to the display rack 3 in the change area, based on a rack change model 142 being a previously learned model of a change related to the display rack 3.

As described above, a rack change model 142 is a model representing a change related to a display rack 3, and therefore the classification unit 130 classifies a change related to a display rack 3 in a area detected as a change area as a type such as a goods being taken out from the display rack 3 or a goods being replenished.

Accordingly, the image processing device 100 according to the present example embodiment can specify not only a change in a goods on a display rack 3 but also the type of the change. Accordingly, the image processing device 100 can more accurately determine a state of the display rack 3 such as a state in which a goods is taken out or a state in which the display rack 3 is replenished.

Since such a classification result tells whether a goods displayed on a display rack 3 is a goods to be purchased or a goods taken in a hand, the image processing device 100 can output data effective in marketing. Further, since such a classification result tells that a customer pushing a cart or holding a shopping basket passes in front of a display rack 3, or the like, the image processing device 100 can output, for example, data usable for acquisition of a flow line of customers in a store.

<Second Example Embodiment>

Figure 7:
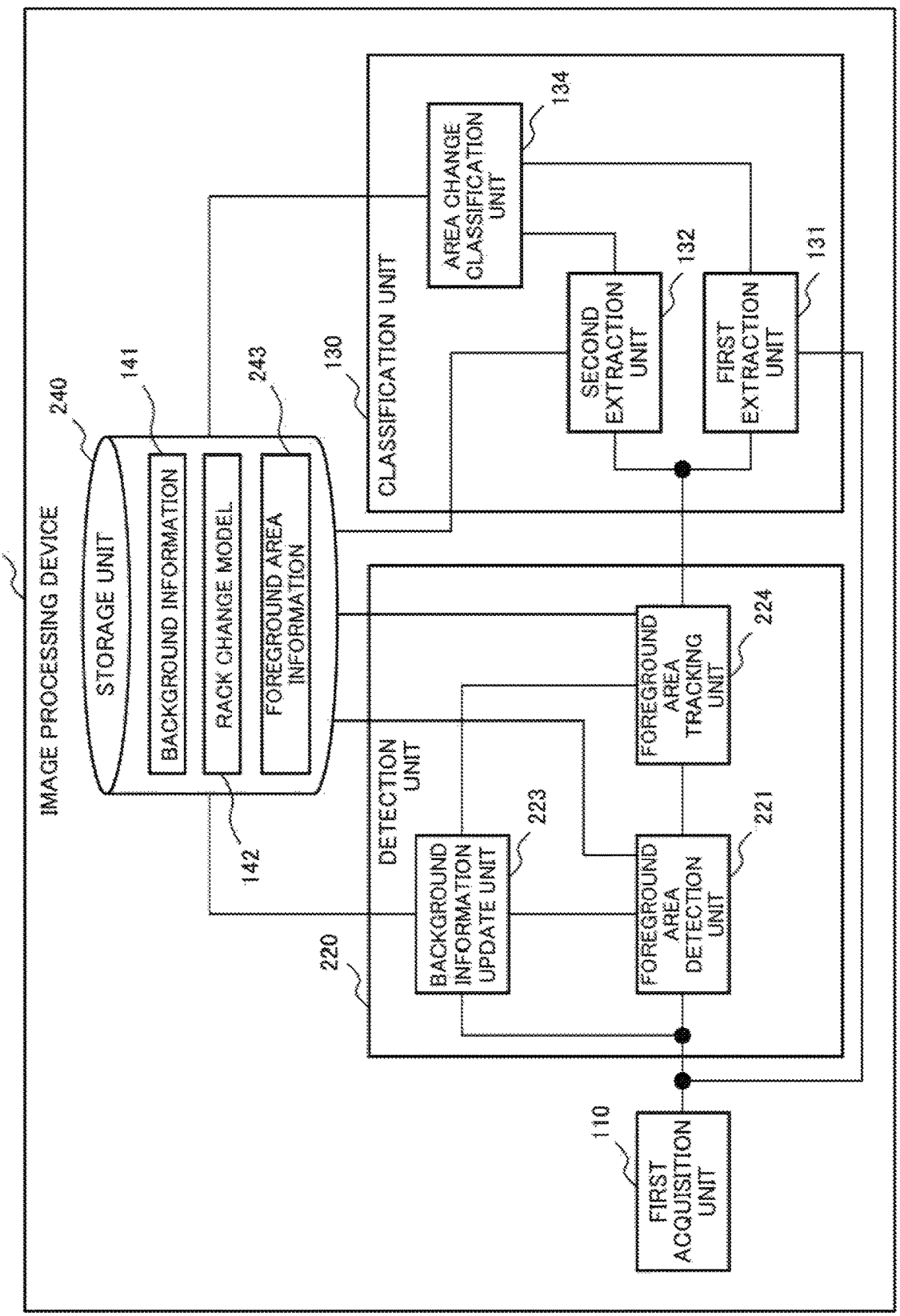
FIG. 7 shows a functional block diagram illustrating an example of a functional configuration of an image processing device according to a second example embodiment.

Next, an image processing device 200 according to a second example embodiment of the present disclosure is described with reference to FIG. 7. FIG. 7 shows a functional block diagram illustrating an example of a functional configuration of the image processing device 200 according to the present example embodiment. The image processing device 200 according to the present example embodiment tracks a change area detected by a foreground area detection unit 221 between a plurality of RGB images. A component having the same function as a component included in a drawing described in first example embodiment is given the same reference sign, and description thereof is omitted.

As illustrated in FIG. 7, the image processing device 200 according to the present example embodiment includes a first acquisition unit 110, a detection unit 220, a classification unit 130, and a storage unit 240. The image processing device 200 includes the detection unit 220 in place of the detection unit 120 in the image processing device 100 and includes the storage unit 240 in place of the storage unit 140.

The image processing device 200 is communicably connected to an image capturing device 2, similarly to the image processing device 100 illustrated in FIG. 1.

The storage unit 240 stores background information 141 and a rack change model 142, similarly to the storage unit 140. Further, the storage unit 240 stores a detection result by the foreground area detection unit 221 as foreground area information 243. The foreground area information 243 is described later.

The detection unit 220 includes the foreground area detection unit 221, a background information update unit 223, and a foreground area tracking unit 224.

The foreground area detection unit 221 detects a change area through an operation similar to that of the foreground area detection unit 121. Then, for example, the foreground area detection unit 221 generates, as a detection result, a binary image expressing a pixel value of a detected change area as 255 and the remaining area as 0, similarly to the foreground area detection unit 121. Then, the foreground area detection unit 221 associates the binary image being a detection result with an image capturing time of a captured image used in generation of the binary image. The foreground area detection unit 221 provides the detection result associated with the image capturing time of the captured image for the background information update unit 223 and the foreground area tracking unit 224. Further, the foreground area detection unit 221 stores the detection result into the storage unit 240 as foreground area information 243. In other words, foreground area information 243 is a binary image associated with an image capturing time of a captured image.

The foreground area tracking unit 224 tracks a change area detected by the foreground area detection unit 221 between a plurality of captured images. The foreground area tracking unit 224 receives a detection result (binary image) provided from the foreground area detection unit 221. Further, the foreground area tracking unit 224 acquires, from the storage unit 140, foreground area information 243 being a binary image generated from a captured image captured before an image capturing time of a captured image related to a binary image being the detection result, the image capturing time being associated with the binary image. Then, by performing processing of correlating change areas represented by binary images with one another, the foreground area tracking unit 224 tracks each change area. For example, the foreground area tracking unit 224 may calculate a degree of similarity, based on at least one of an area, a shape, and an aspect ratio of a circumscribed rectangle of a change area represented by a binary image provided from the foreground area detection unit 221, and foreground area information 243 acquired from the storage unit 240, and correlate change areas maximizing the calculated degree of similarity with one another. Further, when the foreground area detection unit 221 is configured to extract color information included in a detected change area from a captured image and associate the acquired color information with the detection result, the foreground area tracking unit 224 may perform tracking by use of the color information. The foreground area detection unit 221 may associate a detection result with an image of a change area in place of color information of the change area.

Then, when the tracking result is greater than or equal to a predetermined time, the foreground area tracking unit 224 provides the binary image being the detection result provided from the foreground area detection unit 221 for the classification unit 130. At this time, the foreground area tracking unit 224 may attach information indicating a captured image used in generation of the binary image and information indicating the background information 141 to the binary image and provide the binary image for the classification unit 130 or may provide the captured image and the background information 141 for the classification unit 130 along with the binary image. Further, when the binary image includes a plurality of change areas and any of the change areas is not tracked for a predetermined time or longer, the foreground area tracking unit 224 may provide the binary image for the classification unit 130 along with information indicating the change area being tracked for the predetermined time or longer.

Further, when the binary image includes a plurality of change areas, the foreground area tracking unit 224 may generate a plurality of binary images in such a way that one binary image includes one change area. For example, the foreground area tracking unit 224 may provide a binary image including only a change area tracked for a predetermined time or longer for the classification unit 130 and discard a binary image including a change area not tracked for the predetermined time or longer. The foreground area tracking unit 224 may receive a binary image for each change area as a detection result from the foreground area detection unit 221. A method of generating a binary image for each change area by the foreground area detection unit 221 is described later.

Further, the foreground area tracking unit 224 provides an update signal indicating update of background information 141 for the background information update unit 223.

Further, for example, when an amount of movement of a change area is greater than or equal to a predetermined threshold value, the foreground area tracking unit 224 may determine that an object included in the change area is a moving body and discard the change area without providing the change area for the classification unit 130. Consequently, the image processing device 200 can delete a change related to a display rack 3 irrelevant to increase and decrease of a goods, such as "a change due to existence of a person in front of a display rack 3" and therefore can more accurately monitor a display state of a goods. The foreground area tracking unit 224 may provide a determination result determining that an object included in a change area is a moving body for the classification unit 130, the determination result being associated with the change area. Then, when a determination result is associated with a change area, the classification unit 130 may classify a change related to a display rack 3 in the change area as a type related to a change other than a change in a goods displayed on the display rack 3. For example, the classification unit 130 may classify a change related to a display rack 3 in the change area as a type related to a change other than a change in a goods such as "a change due to existence of a person in front of a display rack 3" or "a change due to existence of a shopping cart in front of a display rack 3."

Further, for example, when providing a detection result indicating a change area for the classification unit 130 after tracking the change area, the foreground area tracking unit 224 may provide an update signal with a value 1 for the background information update unit 223 along with information indicating the change area. Further, when not providing a detection result for the classification unit 130, the foreground area tracking unit 224 may provide an update signal with a value 0 for the background information update unit 223 along with information indicating the change area. An update signal with a value 1 is an instruction indicating updating of an image of a part corresponding to a change area in background information 141, and an update signal with a value 0 is an instruction indicating no updating of an image of a part corresponding to a change area in background information 141. For example, based on a tracking time included in a tracking result, or, for example, purchase information or stocking information of a goods, work information of a clerk, or the like that are transmitted from a device external to the image processing device 200, the foreground area tracking unit 224 may output an update signal with a value 1 in such a way as to update a background of a display rack 3 when there is a high possibility that the goods included in a change area is purchased or replenished.

The background information update unit 223 updates background information 141 through an operation similar to that of the background information update unit 123, based on a captured image provided from the first acquisition unit 110, a detection result provided from the foreground area detection unit 221, the background information 141, and an update signal provided from the foreground area tracking unit 224.

The background information update unit 223 may not update, for example, an image of a part corresponding to a change area indicated by a detection result provided from the foreground area detection unit 221, in an RGB image indicated by background information 141. For example, when receiving the aforementioned update signal with a value 0 from the foreground area tracking unit 224, the background information update unit 223 does not update background information of a area corresponding to the change area.

When not outputting a detection result to the classification unit 130, the foreground area tracking unit 224 provides an update signal with a value 0 for the background information update unit 223. For example, the case of not outputting a detection result to the classification unit 130 refers to a case of a tracking result being less than a predetermined time or a case of an amount of movement of a change area being greater than or equal to a predetermined threshold value. Thus, when a tracking result satisfies a first predetermined condition, the background information update unit 223 receives an update signal with a value 0 and does not update background information of a area corresponding to the change area. In other words, the background information update unit 223 updates a area other than the area corresponding to the change area in the background information 141. Consequently, a area in a captured image acquired by the first acquisition unit 110 next, the area corresponding to a area not being updated, becomes more likely to be detected as a change area by the foreground area detection unit 221.

Further, for example, when a value of an update signal provided from the foreground area tracking unit 224 is 1, the background information update unit 223 may update an image of a part corresponding to a change area indicated by a detection result provided from the foreground area detection unit 221, in an RGB image indicated by background information 141. When a tracking result is greater than or equal to a predetermined time, the foreground area tracking unit 224 provides a detection result indicating a tracked change area for the classification unit 130 and then provides an update signal with a value 1 for the background information update unit 223. In other words, when a tracking result satisfies a second predetermined condition that the result is a result tracked for a predetermined time or longer, the background information update unit 223 may receive an update signal with a value 1 from the foreground area tracking unit 224 and update an image of a part corresponding to the change area in the background information 141. Consequently, the background information update unit 223 can bring the background information 141 stored in the storage unit 140 closer to a captured image acquired by the first acquisition unit 110 at that point in time. Accordingly, the image processing device 200 can prevent a area on a captured image acquired by the first acquisition unit 110 next, the area corresponding to the aforementioned change area, from being detected as a change area by the foreground area detection unit 221.

The classification unit 130 classifies a change related to a display rack 3 through an operation described in the first example embodiment. At this time, when receiving both of a binary image being a detection result provided from the foreground area detection unit 221 and information indicating a change area tracked for a predetermined time or longer, the first extraction unit 131 and the second extraction unit 132 may perform the extraction processing of a first image of interest and a second image of interest, respectively, on the change area tracked for the predetermined time or longer.

Figure 8:
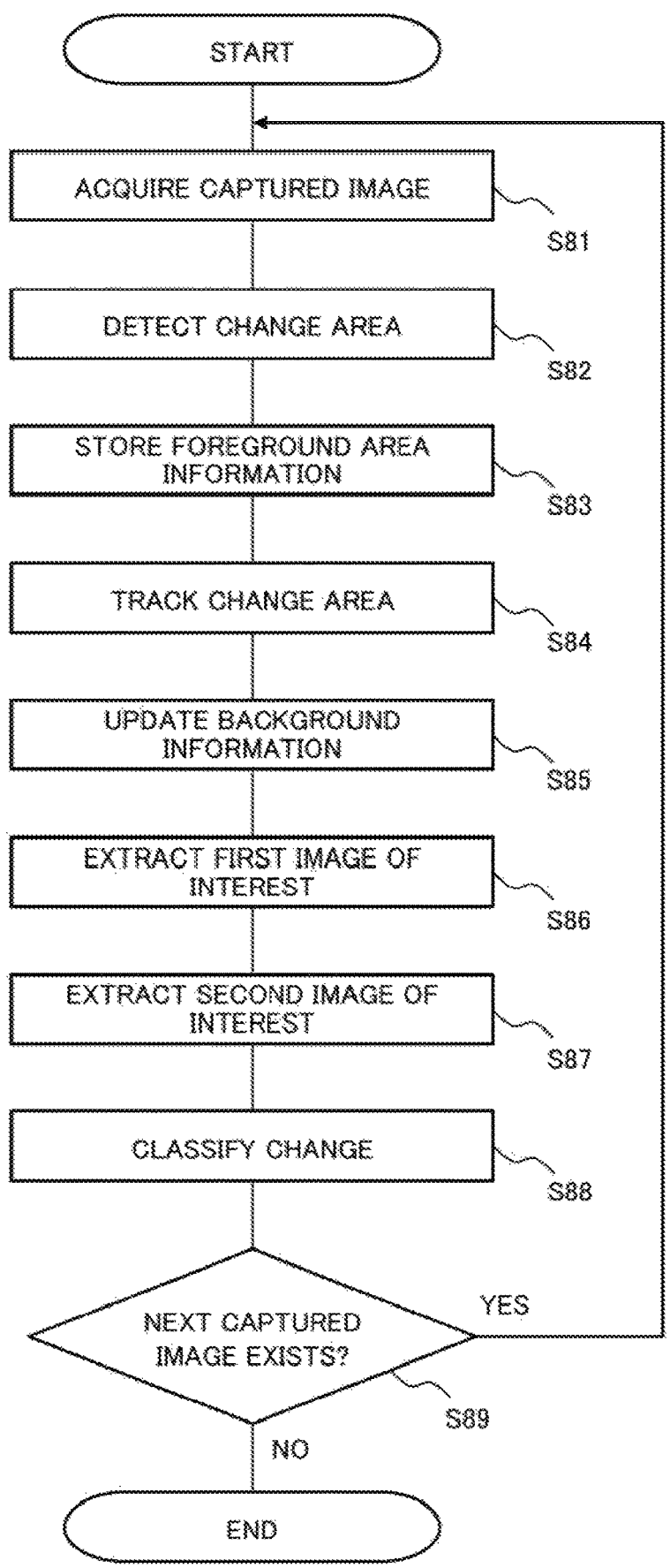
FIG. 8 shows a flowchart illustrating an example of an operation flow in the image processing device according to the second example embodiment.

Next, an operation flow in the image processing device 200 according to the present example embodiment is described with reference to FIG. 8. FIG. 8 shows a flowchart illustrating an example of an operation flow in the image processing device 200 according to the present example embodiment. Steps S81 and S82 described in FIG. 8 are similar to S51 and S52 described in FIG. 5, respectively.

After Step S82 ends, the foreground area detection unit 221 stores foreground area information 243 into the storage unit 240 (Step S83). As described above, the foreground area information 243 is a detection result associated with an image capturing time.

Next, the foreground area tracking unit 224 tracks the change area, based on the detection result provided from the foreground area detection unit 221 and the foreground area information 243 (Step S84). The foreground area tracking unit 224 provides a binary image indicating a change area tracked for a predetermined time or longer for the classification unit 130. The foreground area tracking unit 224 provides an update signal indicating updating of the background information 141 for the background information update unit 223.

The background information update unit 223 updates the background information 141, based on the captured image provided from the first acquisition unit 110, the detection result of the change area provided from the foreground area detection unit 221, the background information 141, and the update signal provided from the foreground area tracking unit 224 (Step S85).

Step S85 may be performed simultaneously with or at an arbitrary timing after Step S84.

Then, the image processing device 200 executes Steps S S86 to S89 being processing similar to Steps S54 to S57 described in FIG. 5.

As described above, a change area detected by the detection unit 220 in the image processing device 200 according to the present example embodiment is tracked between a plurality of captured images, and the classification unit 130 classifies a change related to a display rack 3, based on the tracking result. For example, the detection unit 220 provides the detection result for the classification unit 130 when the tracking result is greater than or equal to a predetermined time, and does not provide the detection result for the classification unit 130 when the tracking result is less than the predetermined time. Accordingly, the classification unit 130 classifies a change related to the display rack 3 with respect to a change area tracked for the predetermined time or longer. Accordingly, a area where a change area is not continuously detected is not classified, and therefore an actually changing area can be accurately classified.

Further, for example, the detection unit 220 further provides the detection result for the classification unit 130 when an amount of movement of the change area is less than a predetermined threshold value and does not provide the detection result for the classification unit 130 when the amount of movement is greater than or equal to the predetermined threshold value. An object with an amount of movement in the change area greater than or equal to the predetermined threshold value is an object other than a goods. Accordingly, a target of the classification processing performed by the classification unit 130 can be narrowed down to a goods on a display rack 3, and therefore classification accuracy of a goods on the display rack 3 can be further enhanced. Further, the image processing device 200 can prevent the classification unit 130 from classifying a moving body such as a person as a change in the display rack 3.

<Third Example Embodiment>

An image processing device 300 according to a third example embodiment of the present disclosure is described with reference to FIG. 9. A goods monitoring system 1 according to the present example embodiment includes the image processing device 300 in place of the image processing device 100. Specifically, the goods monitoring system 1 includes an image capturing device 2 and the image processing device 300. The image capturing device 2 included in the goods monitoring system 1, according to the present example embodiment, may include a plurality of image capturing devices respectively acquiring different types of images. For example, the image capturing device 2 may include an RGB camera acquiring an RGB image and a depth camera acquiring a distance image. In this case, the RGB camera and the depth camera are provided at adjacent positions and capture images of the same target (display rack 3). Further, it is preferable that the RGB camera and the depth camera be time synchronized and capture images of the display rack 3 almost at the same time. Specifically, it is preferable that the depth camera be a camera outputting a distance image in which an image of an image capturing range of an RGB image captured by the RGB camera is captured within a predetermined time from an image capturing time of the RGB image. Further, the image capturing device 2 may be a sensor capable of acquiring a plurality of types of images (for example, an RGB image and a distance image). For example, the image capturing device 2 may be an RGBD camera.

Figure 9:
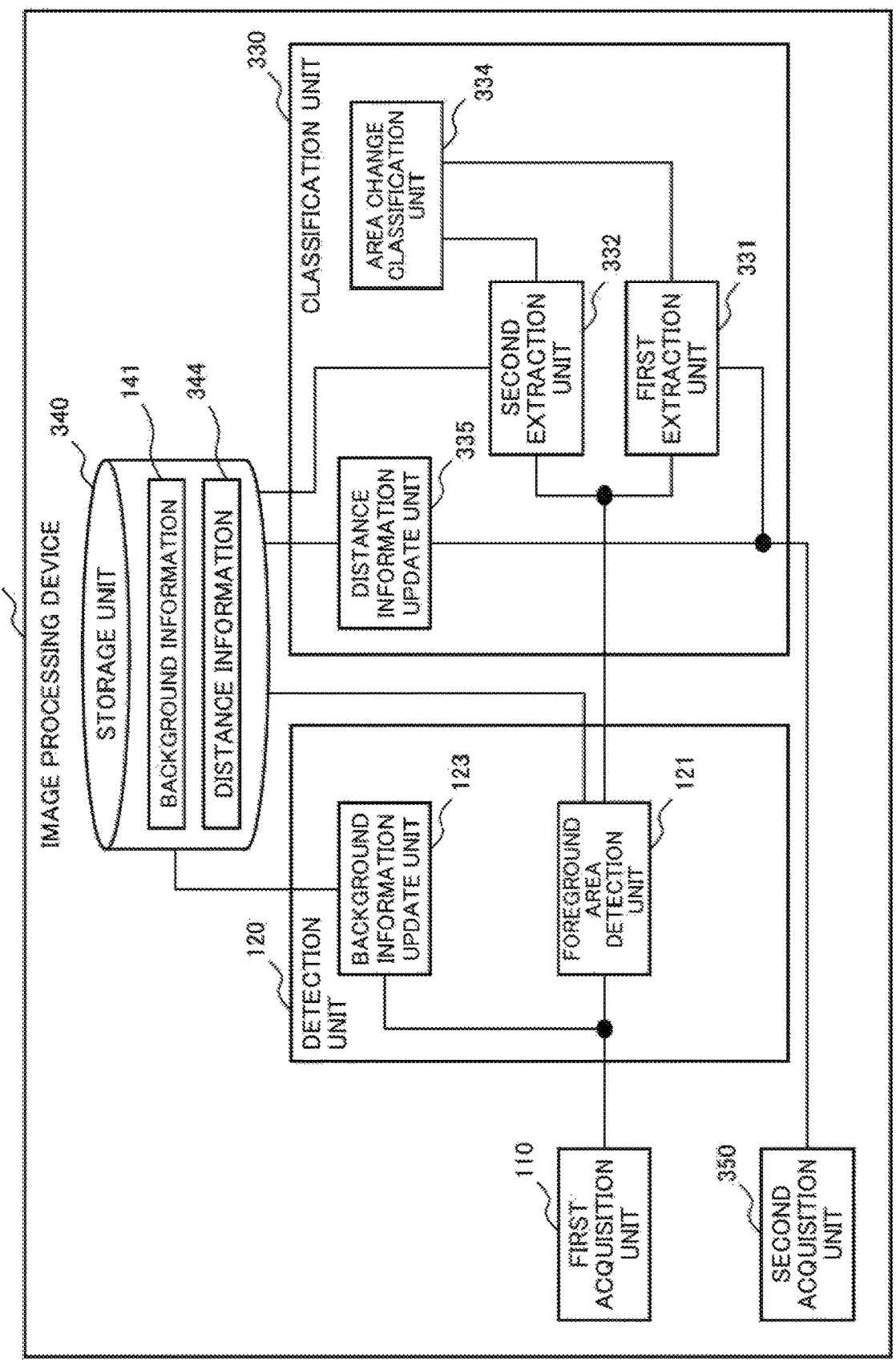
FIG. 9 shows a functional block diagram illustrating an example of a functional configuration of an image processing device according to a third example embodiment.

FIG. 9 shows a functional block diagram illustrating an example of a functional configuration of the image processing device 300 according to the present example embodiment. The image processing device 300 according to the present example embodiment classifies a change related to a display rack 3 in a change area, based on a second captured image being a distance image acquired by a second acquisition unit 350. A component having the same function as a component included in a drawing described in each of the aforementioned example embodiments is given the same reference sign, and description thereof is omitted.

As illustrated in FIG. 9, the image processing device 300 includes a first acquisition unit 110, a detection unit 120, a classification unit 330, a storage unit 340, and a second acquisition unit 350.

The first acquisition unit 110 acquires a captured image being an RGB image, similarly to the first acquisition unit 110 according to the aforementioned first example embodiment. A captured image being an RGB image acquired by the first acquisition unit 110 is hereinafter referred to as a first captured image.

The second acquisition unit 350 receives an image signal representing a captured image acquired by capturing an image of a display rack 3 by the image capturing device 2, similarly to the first acquisition unit 110, and acquires a distance image from the image signal. The second acquisition unit 350 receives an image signal being a different type from an image signal acquired by the first acquisition unit 110. For example, when an image signal acquired by the first acquisition unit 110 is an image signal constituting an RGB image, the second acquisition unit 350 acquires an image signal constituting a distance image. For example, a distance image may refer to an image having a value of a distance from the image capturing device 2 to a target. Further, for example, each pixel in a distance image may have a value in a range from 0 to 255. At this time, for example, a value of each pixel, that is, a distance value may approach 0 as the target gets closer to the image capturing device 2 and may approach 255 as the target gets farther. A value of each pixel in a distance image is not limited to the above. The present example embodiment is described on an assumption that a second captured image acquired by the second acquisition unit 350 is a gray-scale distance image.

The second acquisition unit 350 may acquire an image signal converted based on a captured image stored inside the image capturing device 2 or in a storage device different from the image capturing device 2 and the image processing device 300, similarly to the first acquisition unit 110. Further, when the image processing device 300 is built into the image capturing device 2, the second acquisition unit 350 may be configured to acquire a captured image itself.

The second acquisition unit 350 converts an acquired image signal into a distance image constituting the image signal and provides the distance image for the classification unit 330. A distance image acquired by converting an image signal by the second acquisition unit 350 or a captured image acquired from the image capturing device 2 is hereinafter referred to as a second captured image.

The first acquisition unit 110 and the second acquisition unit 350 may be integrally formed. Further, a first captured image and a second captured image are associated with one another, based on information indicating a position of image capture and an image capturing time.

The storage unit 340 stores background information 141, similarly to the storage unit 140 and the storage unit 240. Further, the storage unit 340 stores distance information 344. The distance information 344 is described later.

The classification unit 330 includes a first extraction unit 331, a second extraction unit 332, a area change classification unit 334, and a distance information update unit 335.

The first extraction unit 331 extracts an image of a change area from a second captured image. Specifically, by use of a second captured image being a distance image provided from the second acquisition unit 350 and a binary image being a detection result provided from a foreground area detection unit 121, the first extraction unit 331 extracts, as a first image of interest, an image of a area on the second captured image corresponding to a area with a pixel value 255 in the binary image. The first extraction unit 331 may extract a first image of interest by a method similar to that by the aforementioned first extraction unit 131. Then, the first extraction unit 331 provides the extracted first image of interest for the area change classification unit 334.

The second extraction unit 332 extracts an image of a change area from a distance image captured before an image capturing time of a distance image being a second captured image associated with a first captured image used in generation of a binary image by the foreground area detection unit 121. Specifically, the second extraction unit 332 receives a binary image being a detection result from the foreground area detection unit 121. Further, the second extraction unit 332 acquires, from the storage unit 340, distance information 344 being a second captured image captured before an image capturing time of a first captured image used in generation of the binary image. Distance information 344 is a second captured image updated by the second acquisition unit 350, to be described later, and is a distance image acquired by the second acquisition unit 350. An image capturing time is associated with distance information 344. As described above, a first captured image and a second captured image are time synchronized, and therefore an image capturing time of a first captured image and an image capturing time of a second captured image associated with the first captured image are almost the same. Accordingly, it can be said that the second extraction unit 332 extracts an image of a change area, as a second image of interest, from a (past) second captured image captured before capture of a second captured image being a target of the extraction processing by the first extraction unit 331.

The second extraction unit 332 extracts a second image of interest by a method similar to the method by which the first extraction unit 331 extracts a first image of interest. The second extraction unit 332 provides the extracted second image of interest for the area change classification unit 334.

The distance information update unit 335 updates distance information 344, based on a distance image provided from the second acquisition unit 350 and the distance information 344 stored in the storage unit 340. For example, the distance information update unit 335 may update distance information 344 through an operation similar to that of the background information update unit 123.

The area change classification unit 334 classifies a change related to a display rack 3 in a change area, based on distance information in the change area. First, the area change classification unit 334 receives a first image of interest from the first extraction unit 331. Further, the area change classification unit 334 receives a second image of interest from the second extraction unit 332. The area change classification unit 334 classifies a change related to the display rack 3 in the change area, based on the first image of interest and the second image of interest.

For example, the area change classification unit 334 may classify a change, based on an operation result acquired by subtracting a value (distance value) of each pixel in a second image of interest from a value (distance value) of each pixel in a first image of interest. For example, when the operation result is a value greater than or equal to a first predetermined threshold value, that is, when a target included in the first image of interest is behind a target included in the second image of interest, the area change classification unit 334 may classify a change related to the display rack 3 in the change area as "a change due to a goods being no longer included on a display rack 3." Further, for example, when the operation result is a value less than or equal to a second predetermined threshold value, that is, when a target included in the first image of interest is closer to the image capturing device 2 than a target included in the second image of interest, the area change classification unit 334 may classify a change related to the display rack 3 in the change area as "a change due to a goods being newly included on a display rack 3." Further, in the other cases, the area change classification unit 334 may classify a change related to the display rack 3 in the change area as "a change due to a change in appearance of a goods displayed on a display rack 3," "a change due to a change in lighting," or the like.

Further, for example, the area change classification unit 334 may perform clustering on a distance value of each pixel in a first image of interest and a distance value of each pixel in a second image of interest, and set a distance value of a class with the maximum a number of elements as a distance value representing each image of interest, and further determine coordinates of a cluster in the class of each image of interest. Then, for example, when an absolute value of a difference between the distance values representing the respective images of interest is less than or equal to a third predetermined threshold value, and also the coordinates of the clusters in the classes of the respective images of interest are apart by a fourth predetermined threshold value or greater, the area change classification unit 334 may classify a change related to the display rack 3 in the change area as "a change due to a change in appearance of a goods displayed on a display rack 3."

Further, for example, the area change classification unit 334 may classify a change related to a display rack 3 in a change area as a type related to a change in a goods displayed on the display rack 3 or a type related to a change due to an object other than a goods displayed on the display rack 3, by use of a result of subtracting a distance value representing a first image of interest from a previously set distance value from the image capturing device 2 to the display rack 3. For example, when the aforementioned result is a positive value, that is, when a target included in an image of a part in a change area in a captured image exists between the image capturing device 2 and the display rack 3, the area change classification unit 334 may classify a change related to the display rack 3 in the change area as a type related to a change due to an object other than a goods displayed on the display rack 3. For example, a type related to a change due to an object other than a goods displayed on the display rack 3 is at least one of "a change due to existence of a person in front of a display rack 3," "a change due to existence of a shopping cart in front of a display rack 3," and "a change due to existence of a person and a shopping cart in front of a display rack 3." Further, when the aforementioned result is not a positive value, the area change classification unit 334 may classify a change related to the display rack 3 in the change area as a type related to a change in a goods displayed on the display rack 3. Thus, by performing the classification processing by use of a first image of interest and a previously set distance value, the area change classification unit 334 can reduce a processing cost required for the classification processing.

Figure 10:
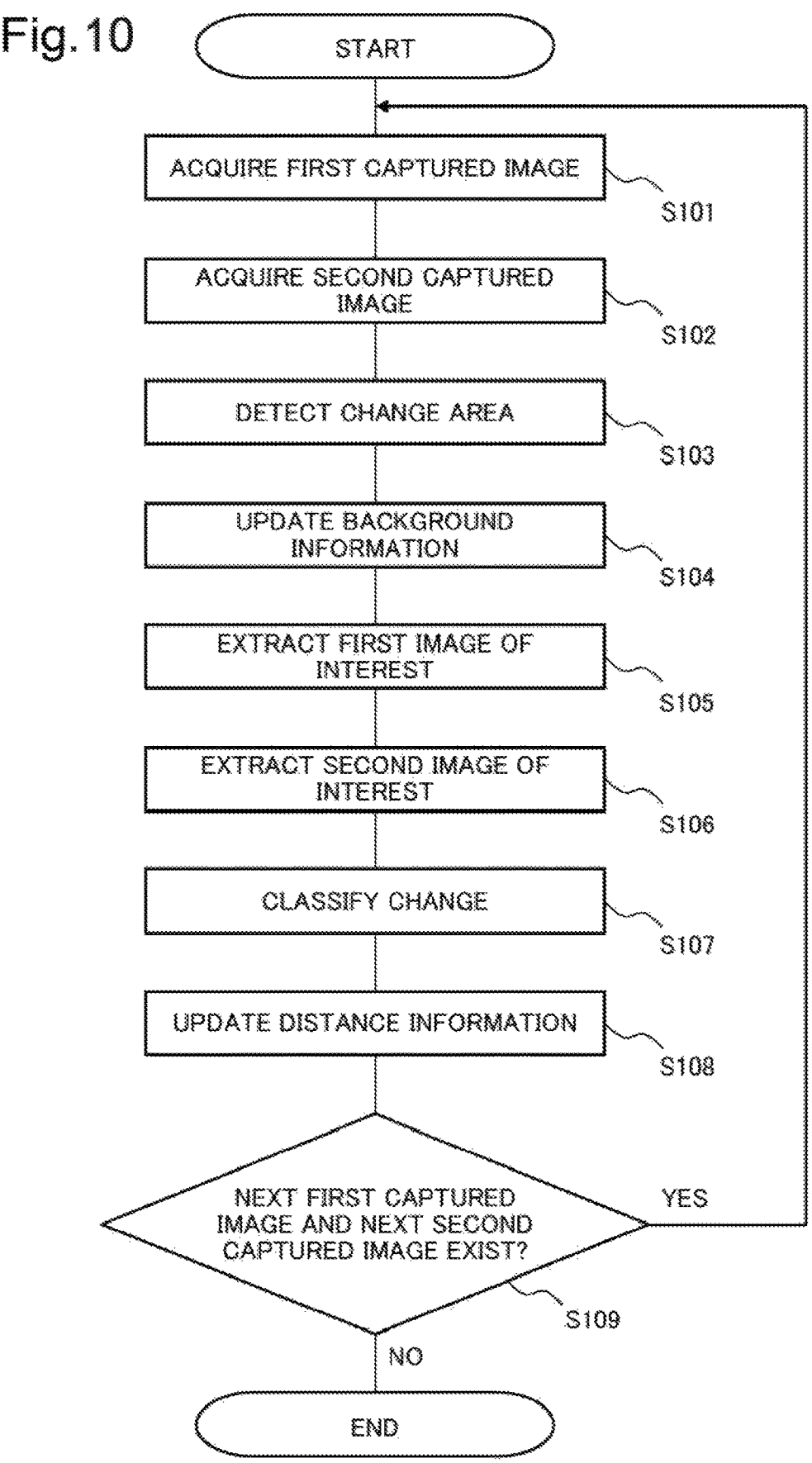
FIG. 10 shows a flowchart illustrating an example of an operation flow in the image processing device according to the third example embodiment.

Next, an operation flow in the image processing device 300 according to the present example embodiment is described with reference to FIG. 10. FIG. 10 shows a flowchart illustrating an example of an operation flow in the image processing device 300.

In Step S101 described in FIG. 10, a first captured image being an RGB image is acquired from an image signal in which an image of a display rack 3 is captured, similarly to S51 described FIG. 5 (Step S101). Further, the second acquisition unit 350 acquires a second captured image being a distance image from the image signal in which the image of the display rack 3 is captured (Step S102). An image capturing time of the second captured image has only to be within a predetermined time from an image capturing time of the first captured image, an image capturing range of the second captured image has only to be an image capturing range of the first captured image, and a timing of acquiring the second captured image by the second acquisition unit 350 has only to be before Step S105.

Then, the foreground area detection unit 121 detects a change area, similarly to Step S52 and Step S53 described in FIG. 5 (Step S103), and the background information update unit 123 updates background information 141 (Step S104).

Then, based on the second captured image provided from the second acquisition unit 350 and a detection result provided from the foreground area detection unit 121, the first extraction unit 331 in the classification unit 330 extracts, as a first image of interest, an image of a area (first area of interest) corresponding to a change area indicated by the detection result on the second captured image (Step S105). The first extraction unit 331 provides the extracted first image of interest for the area change classification unit 334.

Further, based on the detection result provided from the foreground area detection unit 121 and distance information 344 indicating a second captured image captured before an image capturing time of the second captured image provided for the first extraction unit 331, the distance information 344 being acquired from the storage unit 340, the second extraction unit 332 in the classification unit 330 extracts a second image of interest from the distance information 344 through an operation similar to that of the first extraction unit 331 (Step S106). The second extraction unit 332 provides the extracted second image of interest for the area change classification unit 334. Step S105 and Step S106 may be performed simultaneously or may be performed in reverse order.

Then, based on a comparison result between a value of each pixel in the first image of interest and a value of each pixel in the second image of interest, the area change classification unit 334 classifies a change related to the display rack 3 in the change area (Step S107).

Next, based on the second captured image provided from the second acquisition unit 350 and the distance information 344, the distance information update unit 335 updates the distance information 344 (Step S108).

Then, the image processing device 300 determines whether or not the first acquisition unit 110 receives a next image signal and also the second acquisition unit 350 receives a next image signal (whether or not a next first captured image and a next second captured image exist) (Step S109). When a next first captured image and a next second captured image exist (YES in Step S109), the processing proceeds to Step S101, and when at least either of a next first captured image and a next second captured image does not exist (NO in Step S109), the image processing device 300 ends the operation.

As described above, the detection unit 120 in the image processing device 300 according to the present example embodiment detects a change area by comparing a first captured image being an RGB image with background information 141 indicating an image captured before an image capturing time of the first captured image, similarly to the first example embodiment. Further, the classification unit 330 in the image processing device 300 classifies a change related to a display rack 3, based on a comparison result between a value of each pixel included in a second captured image being a distance image and a value of each pixel in distance information 344 captured before an image capturing time of the second captured image.

Even with such a configuration, the image processing device 300 according to the present example embodiment can more accurately determine a state of a display rack 3, similarly to the image processing device 100.

<Fourth Example Embodiment>

Figure 11:
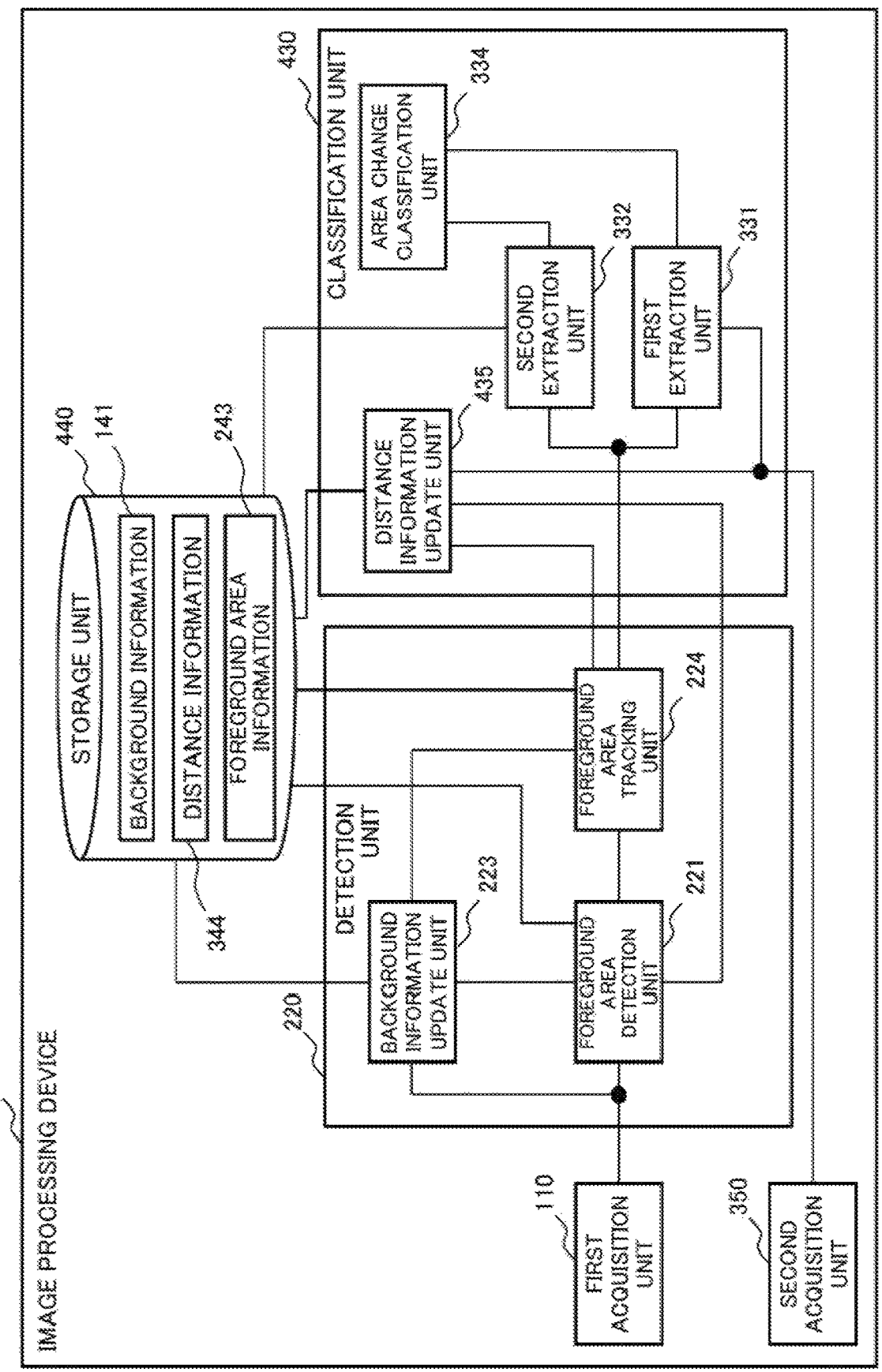
FIG. 11 shows a functional block diagram illustrating an example of a functional configuration of an image processing device according to a fourth example embodiment.

An image processing device 400 according to a fourth example embodiment of the present disclosure is described with reference to FIG. 11. FIG. 11 shows a functional block diagram illustrating an example of a functional configuration of the image processing device 400 according to the present example embodiment. The image processing device 400 according to the present example embodiment further includes a foreground area tracking unit 224 in the detection unit 120 in the image processing device 300 and tracks a change area detected by a foreground area detection unit 221 between a plurality of RGB images.

The image processing device 400 is communicably connected to an image capturing device 2, similarly to the image processing device 100 illustrated in FIG. 1. A component having the same function as a component included in a drawing described in each of the aforementioned example embodiments is given the same reference sign, and description thereof is omitted.

As illustrated in FIG. 11, the image processing device 400 according to the present example embodiment includes a first acquisition unit 110, a detection unit 220, a classification unit 430, a storage unit 440, and a second acquisition unit 350. The image processing device 400 according to the present example embodiment includes the detection unit 220 in the image processing device 200 in place of the detection unit 120 in the image processing device 300 and includes the classification unit 430 and the storage unit 440 in place of the classification unit 330 and the storage unit 340 in the image processing device 300. The foreground area tracking unit 224 according to the present example embodiment may output an update signal to a distance information update unit 435.

The storage unit 440 stores background information 141 and distance information 344, similarly to the storage unit 340 according to the third example embodiment, and further stores foreground area information 243 described in the second example embodiment.

The classification unit 430 includes a first extraction unit 331, a second extraction unit 332, a area change classification unit 334, and the distance information update unit 435. The distance information update unit 435 updates distance information through an operation similar to that of the distance information update unit 335.

Further, for example, the distance information update unit 435 may not update a part corresponding to a change area indicated by a binary image provided from the foreground area detection unit 221, in a distance image indicated by distance information 344. In other words, the distance information update unit 435 may update a part other than a part corresponding to a change area, in a distance image indicated by distance information 344. By not updating distance information of a part corresponding to a change area by the distance information update unit 435, a difference in a part corresponding to the change area between a second captured image acquired by the second acquisition unit 350 and a distance image captured before an image capturing time (at a past time) of the second captured image is clarified.

Further, for example, when a value of an update signal provided from the foreground area tracking unit 224 is 1, the distance information update unit 435 may update a part corresponding to a change area indicated by a detection result provided from the foreground area detection unit 221, in a distance image indicated by distance information 344. In other words, the distance information update unit 435 may update distance information of a part corresponding to a change area tracked by the foreground area tracking unit 224 in distance information 344 after a detection result (binary image) indicating the change area is provided for the classification unit 430. Consequently, the distance information update unit 435 can bring the distance information 344 stored in the storage unit 440 closer to a second captured image acquired by the second acquisition unit 350 at that point in time. Accordingly, the image processing device 400 can further enhance accuracy of a result of comparison of distance values by the area change classification unit 334 using a area on a second captured image acquired by the second acquisition unit 350 next, the area corresponding to a change area.

Figure 12:
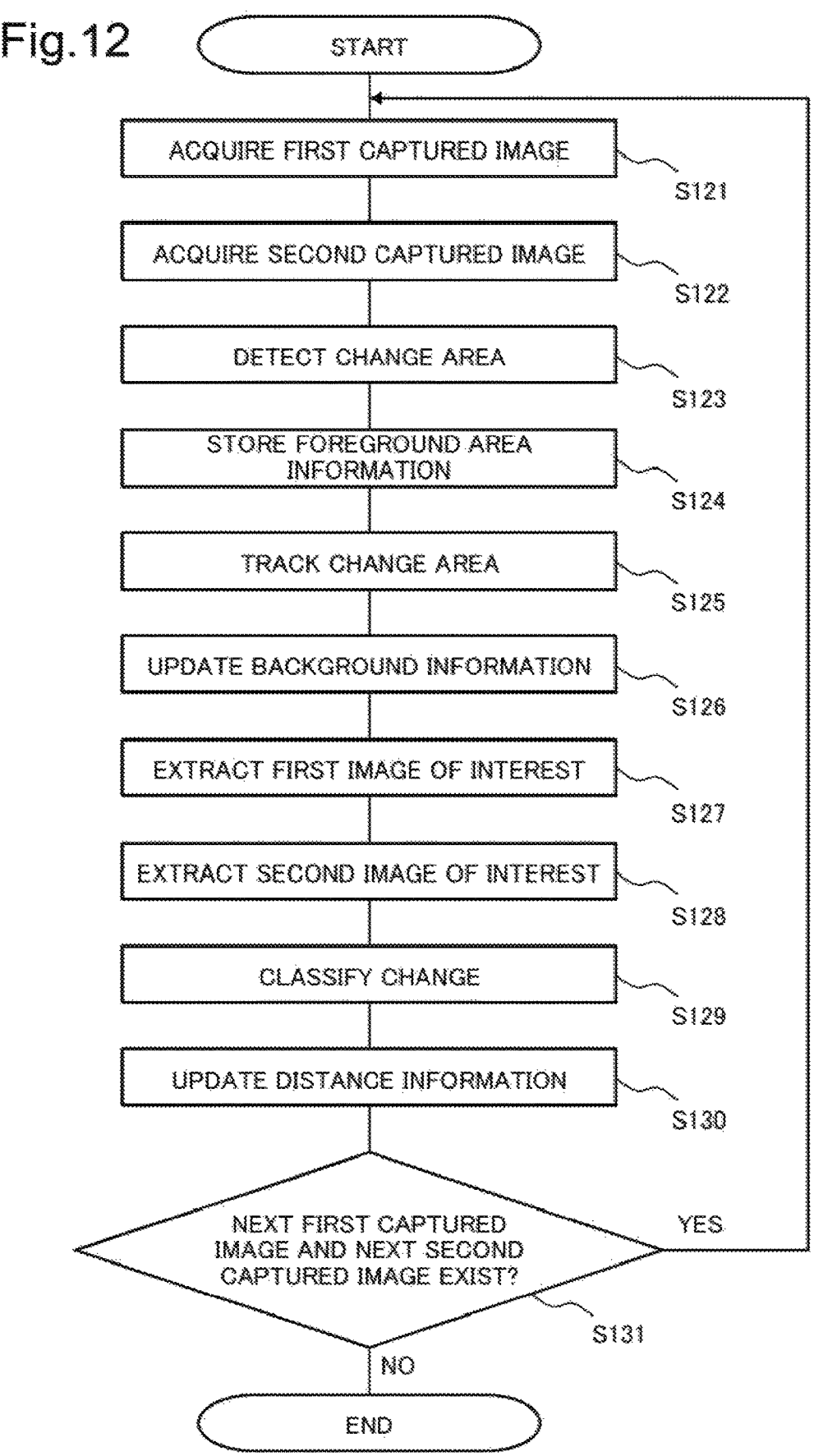
FIG. 12 shows a flowchart illustrating an example of an operation flow in the image processing device according to the fourth example embodiment.

Next, an operation flow in the image processing device 400 according to the present example embodiment is described with reference to FIG. 12. FIG. 12 shows a flowchart illustrating an example of an operation flow in the image processing device 400 according to the present example embodiment.

Step S121 to Step S123 described in FIG. 12 are processing similar to S101 to S103 described in FIG. 10, respectively.

After Step S123 ends, the foreground area detection unit 221 stores foreground area information 243 into the storage unit 440, similarly to aforementioned Step S83 (Step S124). Then, the foreground area tracking unit 224 tracks a change area, based on a detection result provided from the foreground area detection unit 221 and the foreground area information 243, similarly to aforementioned Step S84 (Step S125). The foreground area tracking unit 224 provides a binary image indicating a change area tracked for a predetermined time or longer for the classification unit 430. The foreground area tracking unit 224 provides an update signal indicating updating of background information 141 and an update signal indicating updating of distance information 344 for the background information update unit 223 and the distance information update unit 435, respectively.

The background information update unit 223 updates the background information 141, based on the first captured image provided from the first acquisition unit 110, the detection result of the change area provided from the foreground area detection unit 221, the background information 141, and the update signal provided from the foreground area tracking unit 224, similarly to aforementioned Step S85 (Step S126).

Subsequently, the image processing device 400 performs processing similar to Step S105 to Step S107 described in FIG. 10 (Step S127 to Step S129). Then, the distance information update unit 435 updates the distance information 344, based on the second captured image provided from the second acquisition unit 350, the distance information 344, and the update signal provided from the foreground area tracking unit 224 (Step S130).

Subsequently, the image processing device 400 determines whether or not a next first captured image and a next second captured image exist, similarly to Step S109 described in FIG. 10 (Step S131). When a next first captured image and a next second captured image exist (YES in Step S131), the processing proceeds to Step S121, and when at least either of a next first captured image and a next second captured image does not exist (NO in Step S131), the image processing device 400 ends the operation.

As described above, the image processing device 400 according to the present example embodiment further includes the foreground area tracking unit 224 according to the second example embodiment in the image processing device 300 according to the third example embodiment. Even with such a configuration, the image processing device 400 according to the present example embodiment can accurately classify an actually changing area, similarly to the image processing device 200 according to the aforementioned second example embodiment.

<Fifth Example Embodiment>

Figure 13:
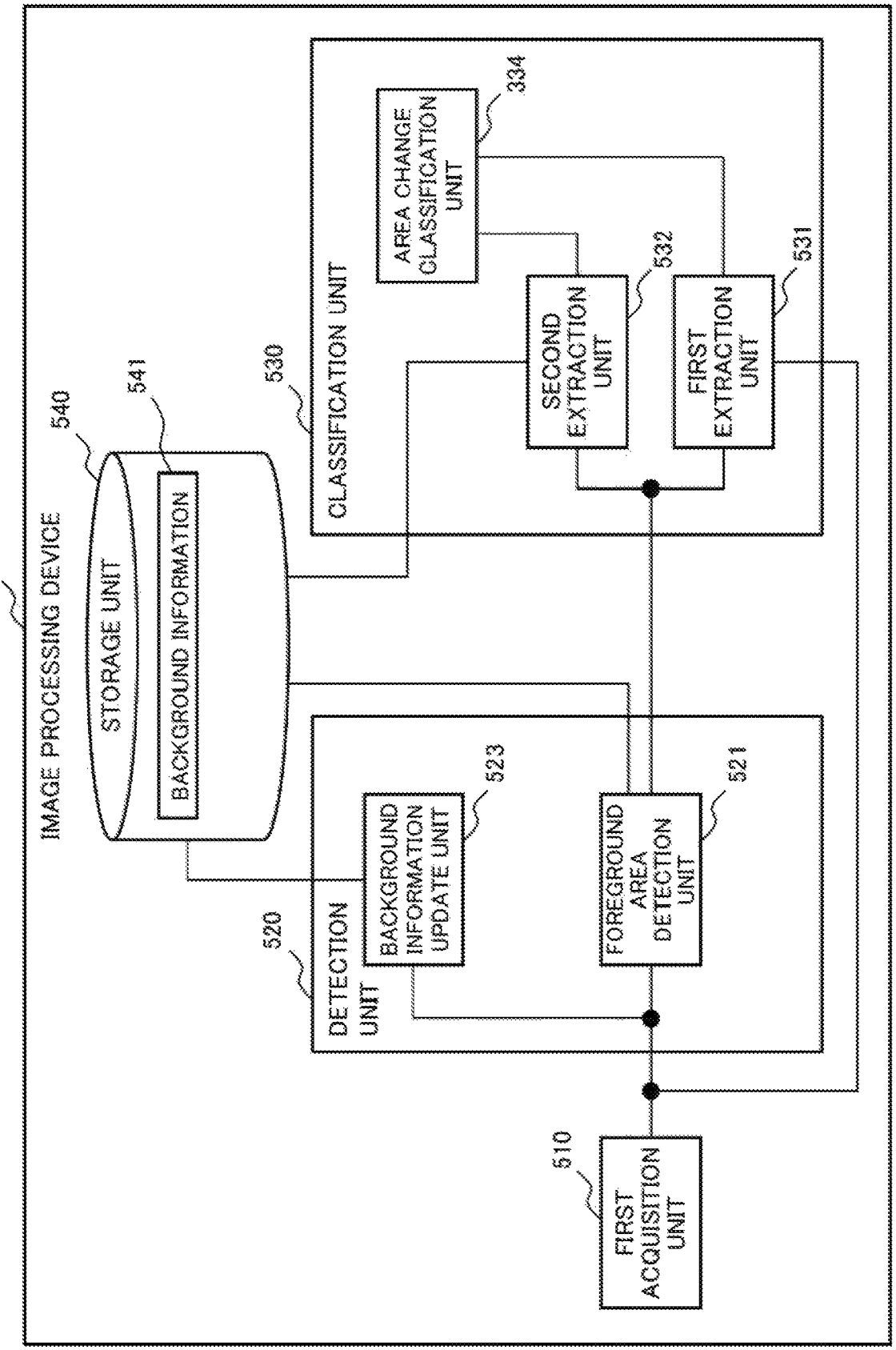
FIG. 13 shows a functional block diagram illustrating an example of a functional configuration of an image processing device according to a fifth example embodiment.

An image processing device 500 according to a fifth example embodiment of the present disclosure is described with reference to FIG. 13. FIG. 13 shows a functional block diagram illustrating an example of a functional configuration of the image processing device 500 according to the present example embodiment. While an example of a captured image input to the detection unit 120 or detection unit 220 being an RGB image has been described in the aforementioned first to fourth example embodiments, an image input to the detection unit may be a distance image. The image processing device 500 according to the present example embodiment is described on an assumption that a distance image is input to a detection unit. The image processing device 500 is communicably connected to an image capturing device 2, similarly to the image processing device 100 illustrated in FIG. 1. Further, a component having the same function as a component included in a drawing described in each of the aforementioned example embodiments is given the same reference sign, and description thereof is omitted.

As illustrated in FIG. 13, the image processing device 500 according to the present example includes a first acquisition unit 510, a detection unit 520, a classification unit 530, and a storage unit 540.

The first acquisition unit 510 acquires a captured image being a distance image, similarly to the aforementioned second acquisition unit 350. The first acquisition unit 510 provides the acquired captured image for the detection unit 520 and the classification unit 530.

The storage unit 540 stores background information 541. The background information 541 is a reference image for making a comparison with a captured image in the detection unit 520 and is also referred to as a background image. As described above, a captured image according to the present example embodiment is a distance image. Accordingly, it is preferable that the background information 541 be a distance image being the same type of image as a captured image. The background information 541 may be a captured image provided first for the detection unit 520 from the first acquisition unit 510 or may be a previously given image. The background information 541 is similar to the aforementioned distance information 344.

The detection unit 520 includes a foreground area detection unit 521 and a background information update unit 523. The foreground area detection unit 521 receives a captured image provided from the first acquisition unit 510. Further, the foreground area detection unit 521 acquires background information 541 related to a captured image from the storage unit 540. The foreground area detection unit 521 detects a area changing between two distance images as a change area (foreground area). For example, the foreground area detection unit 521 may detect a change area through an operation similar to that of the foreground area detection unit 121. The foreground area detection unit 521 generates, as a detection result of a change area, a binary image expressing a pixel value of the detected change area as 255 and the remaining area as 0, similarly to the foreground area detection unit 121, and provides the generated binary image for the classification unit 530.

The background information update unit 523 updates background information 541, based on a captured image provided from the first acquisition unit 510 and a distance image being background information 541 stored in the storage unit 540. For example, the background information update unit 523 may update background information 541 through an operation similar to that of the background information update unit 123.

The classification unit 530 includes a first extraction unit 531, a second extraction unit 532, and a area change classification unit 334.

The first extraction unit 531 extracts a first image of interest from a captured image, similarly to the first extraction unit 331. Then, the first extraction unit 531 provides the extracted first area of interest for the area change classification unit 334.

The second extraction unit 532 extracts an image of a change area from the background information 541 as a second image of interest. An extraction method of a second image of interest by the second extraction unit 532 is similar to that by the second extraction unit 332.

The area change classification unit 334 classifies a change related to a display rack 3 in a change area, based on distance information in the change area, similarly to the area change classification unit 334 described in the third example embodiment.

Figure 14:
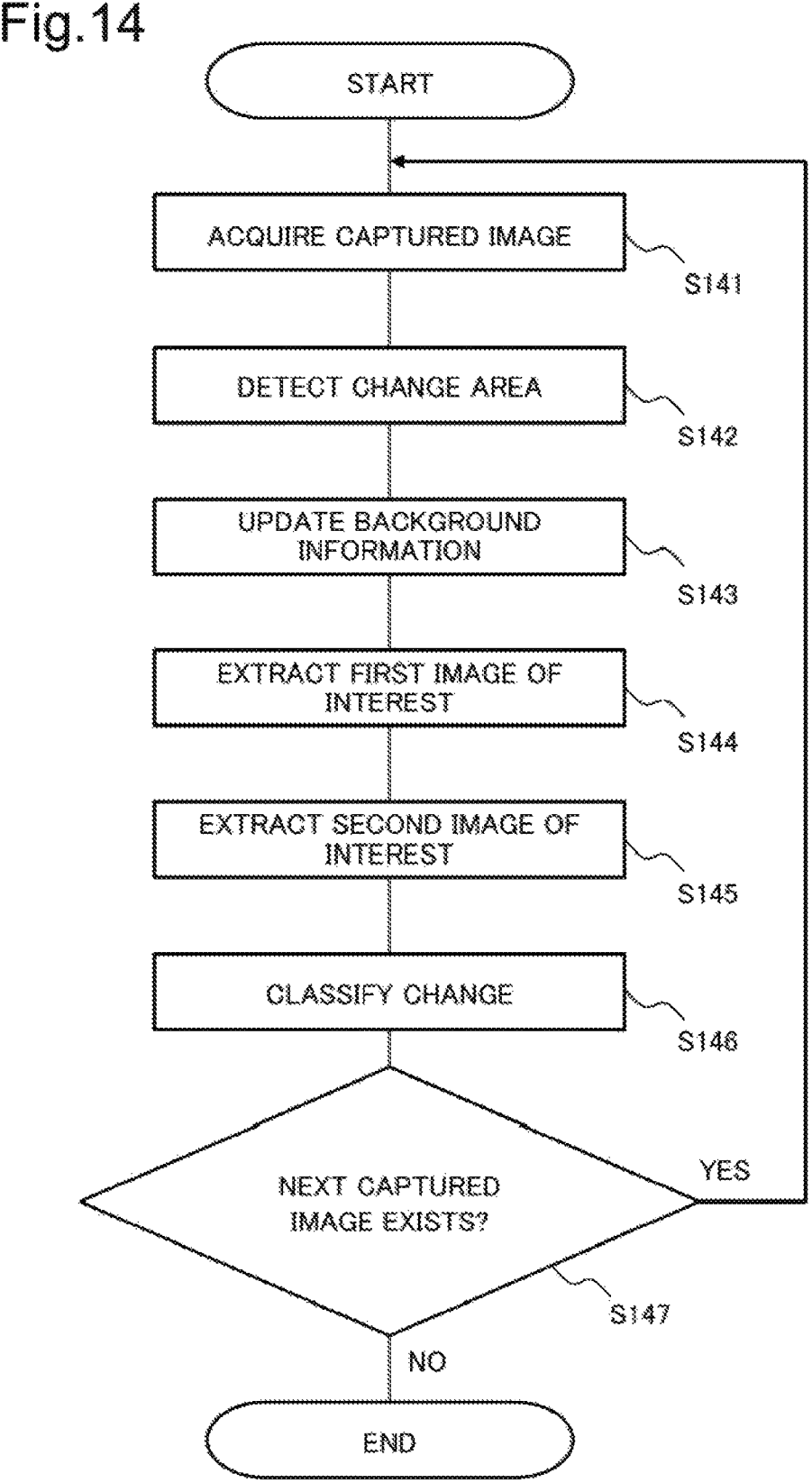
FIG. 14 shows a flowchart illustrating an example of an operation flow in the image processing device according to the fifth example embodiment.

Next, an operation flow in the image processing device 500 according to the present example embodiment is described with reference to FIG. 14. FIG. 14 shows a flowchart illustrating an example of an operation flow in the image processing device 500 according to the present example embodiment.

First, the first acquisition unit 510 acquires a captured image being a distance image from an image signal in which an image of a display rack 3 is captured (Step S141). The first acquisition unit 510 provides the acquired captured image for the detection unit 520 and the classification unit 530.

Next, by use of the captured image being a distance image provided from the first acquisition unit 510 and background information 541 being a distance image stored in the storage unit 540, the foreground area detection unit 521 in the detection unit 520 detects a area changing between the two distance images as a change area (Step S142). Then, the foreground area detection unit 521 provides the detection result of the change area for the classification unit 530.

Further, the background information update unit 523 updates the background information 541 by use of the captured image and the background information 541 (Step S143). Step S143 may be performed at any timing after Step S141.

Based on the captured image provided from the first acquisition unit 510 and the detection result being related to the captured image and being provided from the foreground area detection unit 521, the first extraction unit 531 in the classification unit 530 extracts an image of a area (first area of interest) corresponding to a change area indicated by the detection result on the captured image, as a first image of interest (Step S144). The first extraction unit 531 provides the extracted first image of interest for the area change classification unit 334.

Further, based on the detection result provided from the foreground area detection unit 521 and the background information 541 being used for acquiring the detection result and being acquired from the storage unit 540, the second extraction unit 532 in the classification unit 530 extracts a second image of interest from the background information 541 through an operation similar to that of the first extraction unit 531 (Step S145). The second extraction unit 532 provides the extracted second image of interest for the area change classification unit 334. Step S144 and Step S145 may be performed simultaneously or may be performed in reverse order.

Then, based on the first image of interest provided from the first extraction unit 531 and the second image of interest provided from the second extraction unit 532, the area change classification unit 334 classifies a change (a change from a state in the second image of interest to a state in the first image of interest) related to the display rack 3 (Step S146).

Then, the image processing device 500 determines whether or not the first acquisition unit 510 receives a next image signal (whether or not a next captured image exists) (Step S147). When a next captured image exists (YES in Step S147), the processing proceeds to Step S141, and when a next captured image does not exist (NO in Step S147), the image processing device 500 ends the operation.

As described above, the detection unit 520 in the image processing device 500 according to the present example embodiment detects a change area by comparing a captured image being a distance image with background information 541 indicating an image captured before an image capturing time of the captured image. Then, based on the comparison result between a value of each pixel included in the captured image and a value of each pixel in the background information 541, the classification unit 530 classifies a change related to the display rack 3.

Even with such a configuration, the image processing device 500 according to the present example embodiment can more accurately determine a state of a display rack 3, similarly to the image processing device 100.

<Sixth Example Embodiment>

Figure 15:
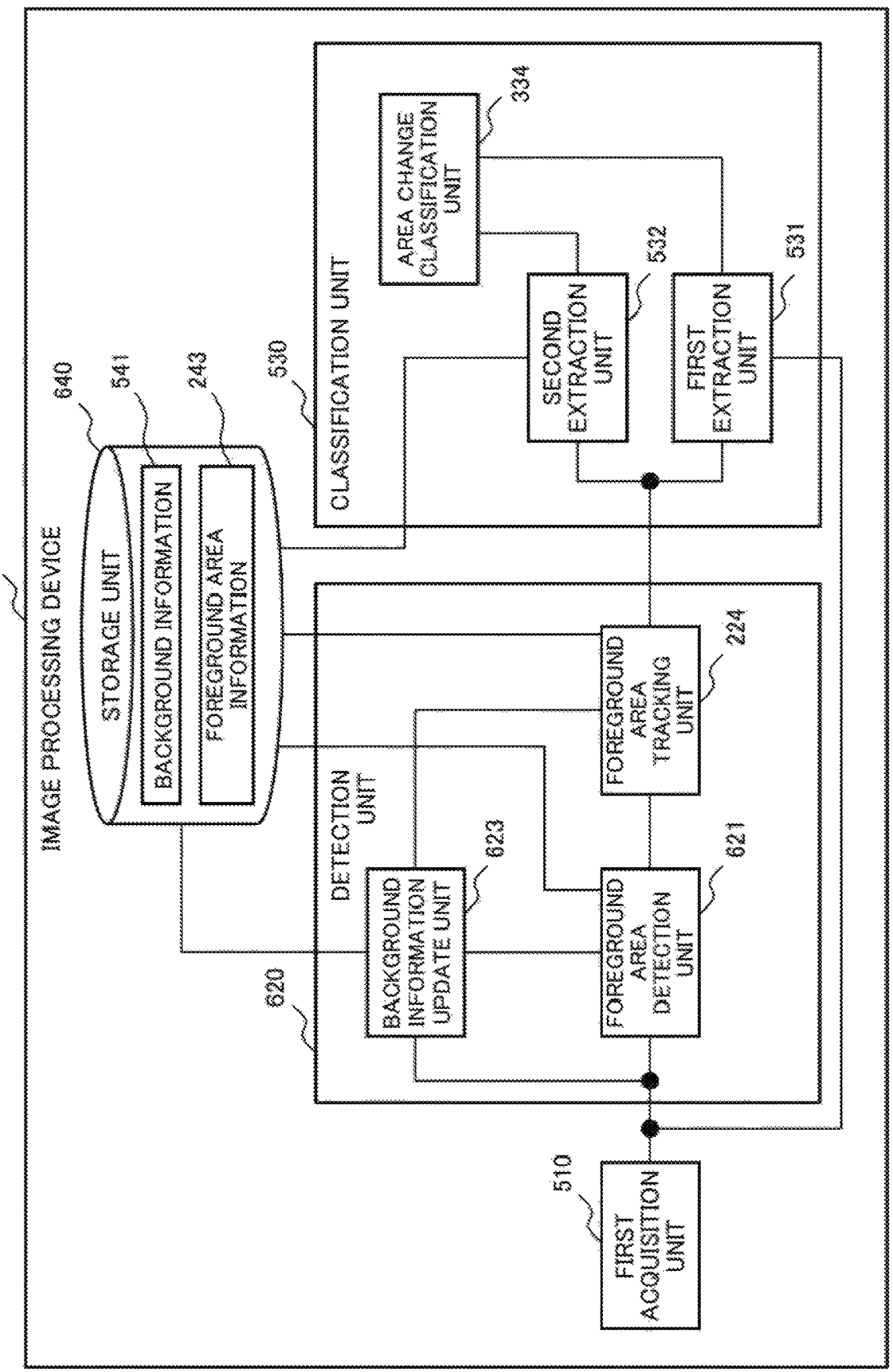
FIG. 15 shows a functional block diagram illustrating an example of a functional configuration of an image processing device according to a sixth example embodiment.

An image processing device 600 according to a sixth example embodiment of the present disclosure is described with reference to FIG. 15. FIG. 15 shows a functional block diagram illustrating an example of a functional configuration of the image processing device 600 according to the present example embodiment. The image processing device 600 according to the present example embodiment tracks a change area detected by a foreground area detection unit 621 between a plurality of distance images.

The image processing device 600 is communicably connected to an image capturing device 2, similarly to the image processing device 100 illustrated in FIG. 1. Further, a component having the same function as a component included in a drawing described in each of the aforementioned example embodiments is given the same reference sign, and description thereof is omitted.

As illustrated in FIG. 15, the image processing device 600 according to the present example embodiment includes a first acquisition unit 510, a detection unit 620, a classification unit 530, and a storage unit 640. The image processing device 600 includes the detection unit 620 in place of the detection unit 520 in the image processing device 500 and includes the storage unit 640 in place of the storage unit 540.

The storage unit 640 stores background information 541, similarly to the storage unit 540. In addition, the storage unit 640 stores foreground area information 243.

The detection unit 620 includes the foreground area detection unit 621, a background information update unit 623, and a foreground area tracking unit 224.

The foreground area detection unit 621 detects a change area through an operation similar to that of the foreground area detection unit 521. Then, for example, the foreground area detection unit 621 generates, as a detection result, a binary image expressing a pixel value of the detected change area as 255 and the remaining area as 0, similarly to the foreground area detection unit 521. Then, the foreground area detection unit 621 associates the binary image being the detection result with an image capturing time of a captured image used in generation of the binary image. The foreground area detection unit 621 provides the detection result associated with the image capturing time of the captured image for the background information update unit 623 and the foreground area tracking unit 224. Further, the foreground area detection unit 621 stores the detection result into the storage unit 640 as foreground area information 243.

The background information update unit 623 updates background information 541 through an operation similar to that of the background information update unit 523, based on a captured image provided from the first acquisition unit 510, a detection result provided from the foreground area detection unit 621, the background information 541, and an update signal provided from the foreground area tracking unit 224. The background information update unit 623 may or may not update an image of a part corresponding to a change area, similarly to the background information update unit 223.

Further, the foreground area tracking unit 224 tracks a change area by use of binary images generated from distance images, similarly to the foreground area tracking unit 224 in the image processing device 200 according to the aforementioned second example embodiment.

Figure 16:
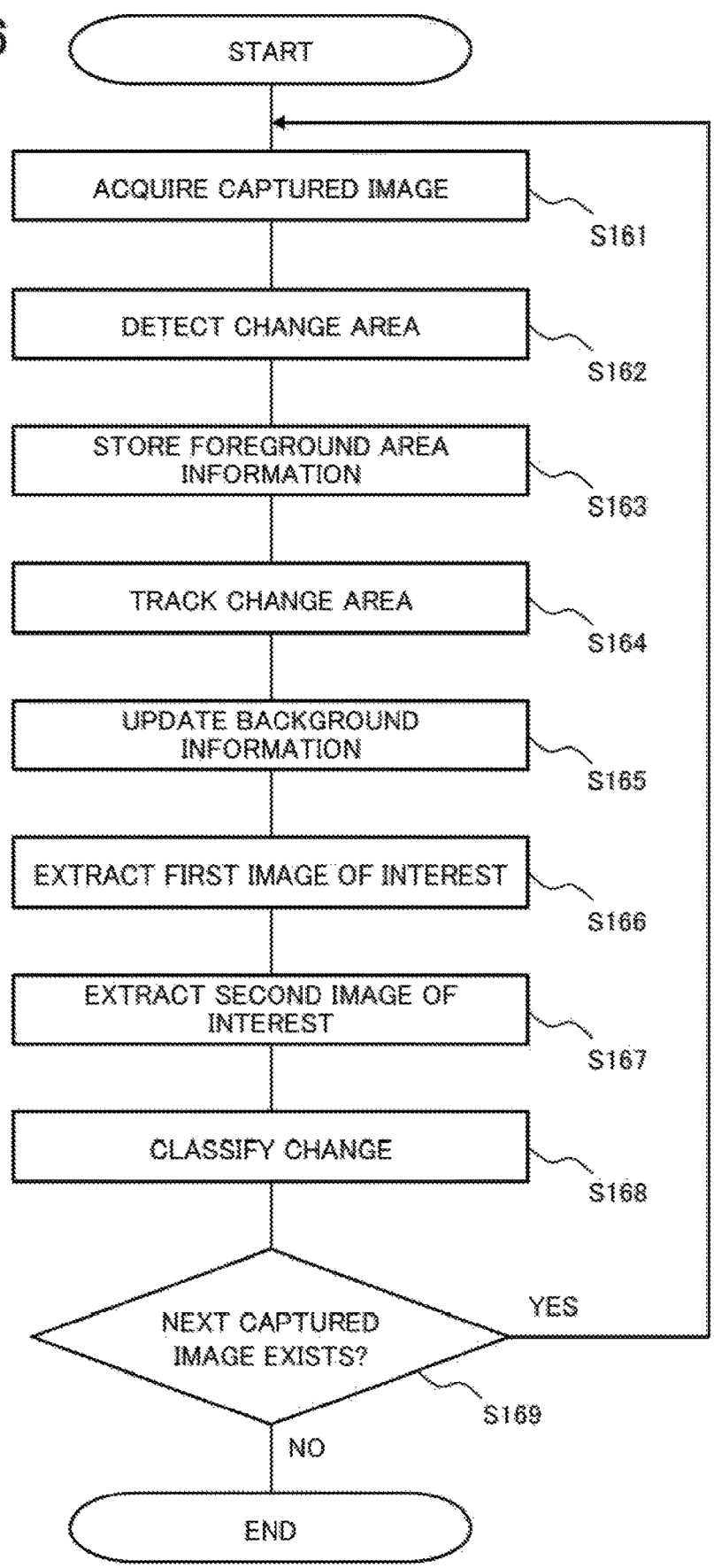
FIG. 16 shows a flowchart illustrating an example of an operation flow in the image processing device according to the sixth example embodiment.

Next, an operation flow in the image processing device 600 according to the present example embodiment is described with reference to FIG. 16. FIG. 16 shows a flowchart illustrating an example of an operation flow in the image processing device 600. Steps S161 and S162 described in FIG. 16 are similar to S141 and S142 described in FIG. 14, respectively.

After Step S162 ends, the foreground area detection unit 621 stores foreground area information 243 into the storage unit 640 (Step S163). As described above, the foreground area information 243 is a detection result associated with an image capturing time.

Next, based on the detection result provided from the foreground area detection unit 621 and the foreground area information 243, the foreground area tracking unit 224 tracks a change area (Step S164). The foreground area tracking unit 224 provides a binary image indicating a change area tracked for a predetermined time or longer for the classification unit 530. The foreground area tracking unit 224 provides an update signal indicating updating of the background information 541 for the background information update unit 623.

Based on the captured image provided from the first acquisition unit 510, the detection result of the change area provided from the foreground area detection unit 621, the background information 541, and the update signal provided from the foreground area tracking unit 224, the background information update unit 623 updates the background information 541 (Step S165).

Step S165 may be performed simultaneously with or at an arbitrary timing after Step S164.

Then, the image processing device 600 executes Steps S166 to S169 being processing similar to Steps S144 to S147 described in FIG. 14.

As described above, the image processing device 600 according to the present example embodiment further includes the foreground area tracking unit 224 according to the second example embodiment in the image processing device 500 according to the fifth example embodiment. Even with such a configuration, the image processing device 600 can accurately classify an actually changing area, similarly to the image processing device 200 according to the aforementioned second example embodiment.

(Modified Example of Foreground Area Detection Unit)

The foreground area detection unit (121, 221, 521, 621) included in the image processing device (100, 200, 300, 400, 500, 600) according to each of the aforementioned example embodiments may specify that a target included in a change area is a target other than a goods in a display rack 3, by further using preregistered rack area information.

While a modified example of the foreground area detection unit 121 in the image processing device 100 is described in this modified example, this modified example is also applicable to the foreground area detection unit in each of the image processing device 200, the image processing device 300, the image processing device 400, the image processing device 500, and the image processing device 600.

Figure 17:
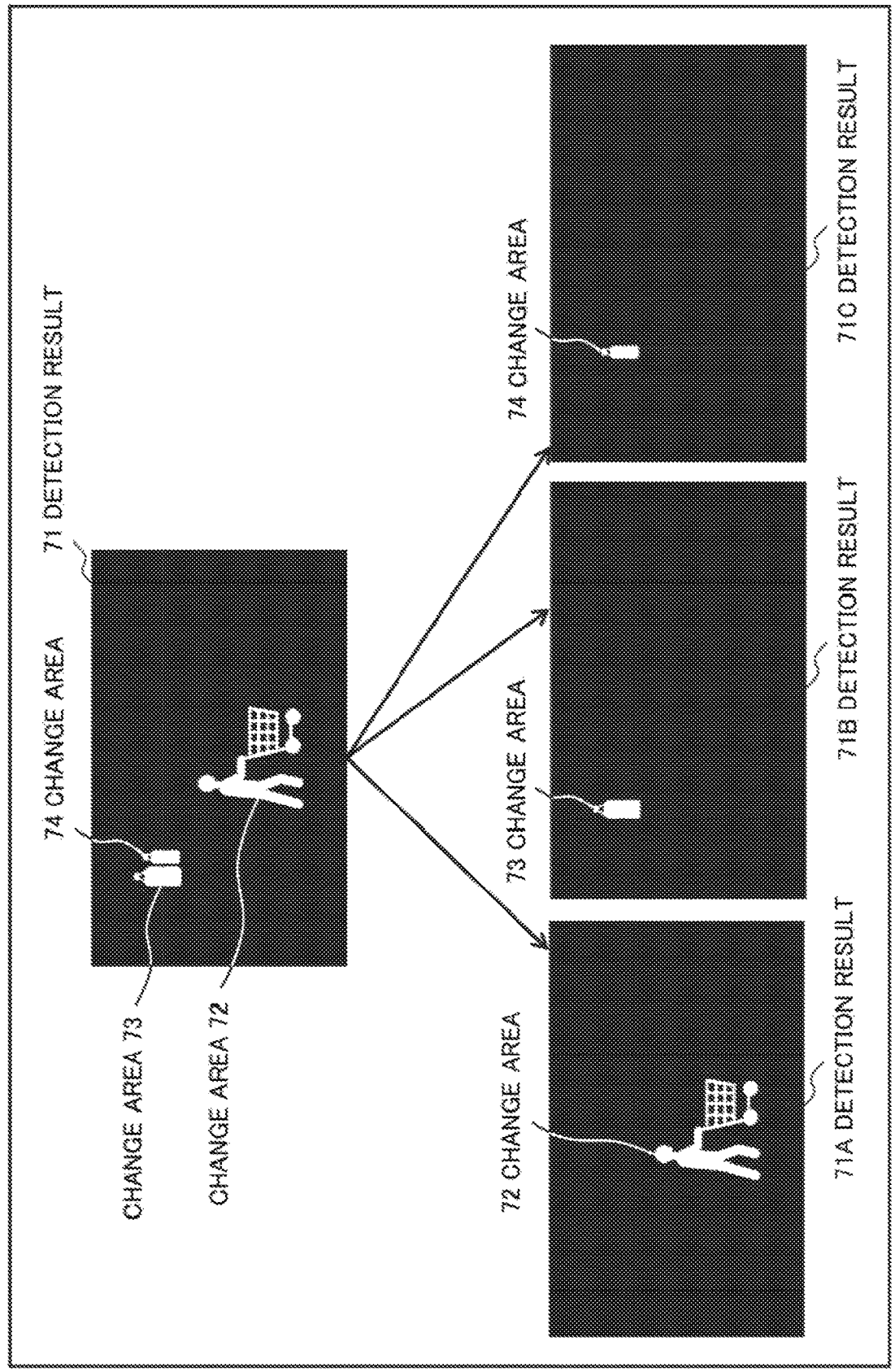
FIG. 17 shows a diagram for illustrating an operation of a foreground area detection unit in a modified example.
Figure 18:
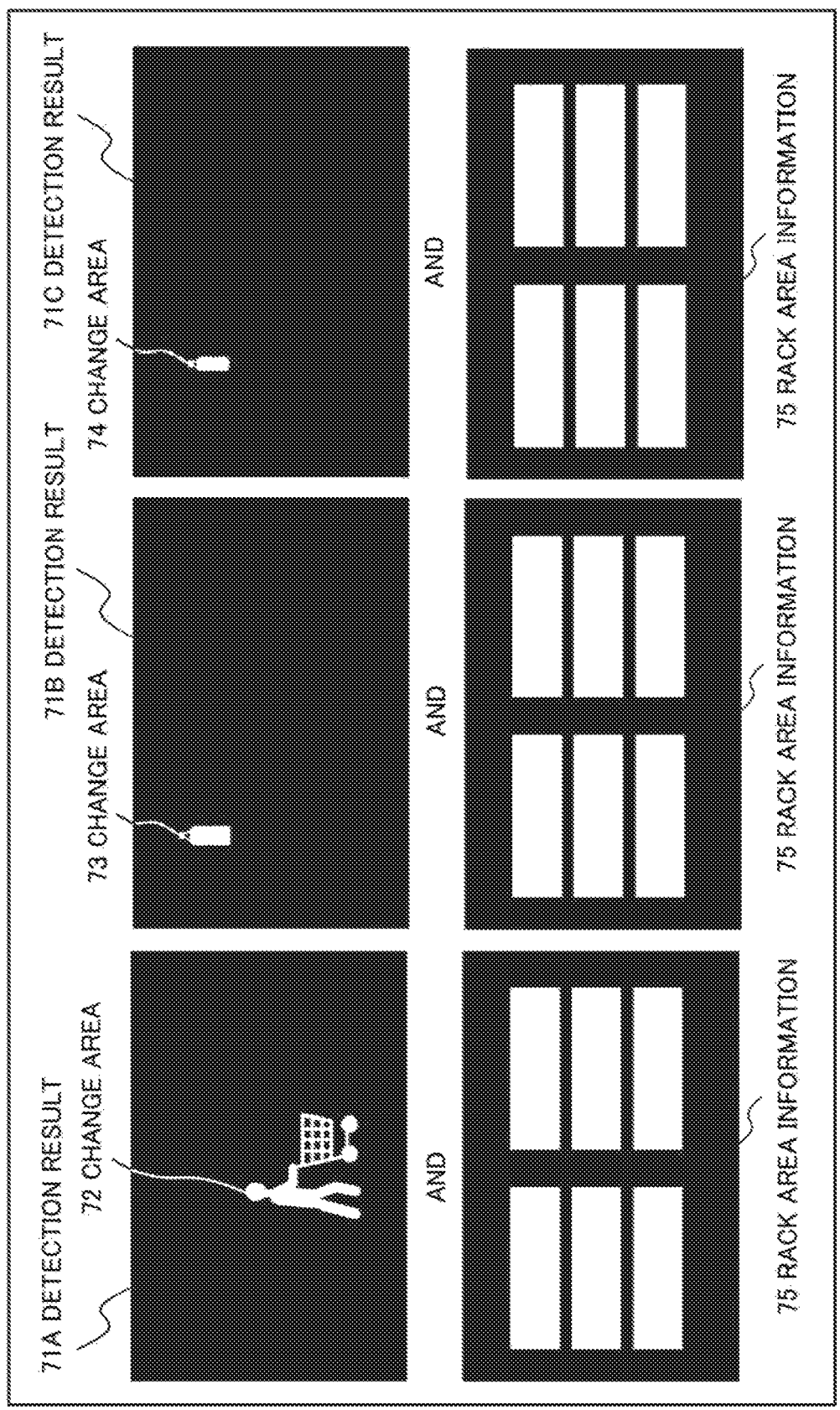
FIG. 18 shows a diagram for illustrating an operation of the foreground area detection unit in the modified example.
Figure 19:
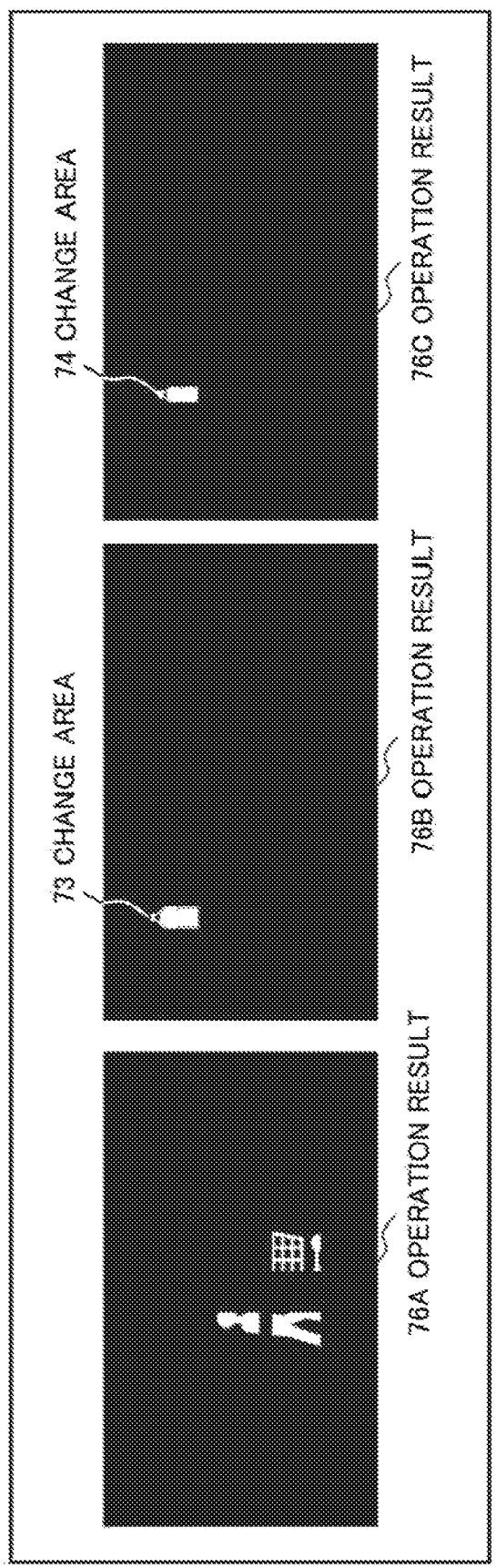
FIG. 19 shows a diagram for illustrating an operation of the foreground area detection unit in the modified example.

FIG. 17 to FIG. 19 show diagrams for illustrating an operation of a foreground area detection unit 121 in this modified example.

It is assumed that the foreground area detection unit 121 detects a change area by comparing a captured image provided from a first acquisition unit 110 with background information 141 and generates, for example, a detection result 71 being a binary image indicating the change area as illustrated in FIG. 17. It is further assumed that the detection result includes three change areas being a change area 72, a change area 73, and a change area 74. The foreground area detection unit 121 generates a detection result 71A, a detection result 71B, and a detection result 71C being separate binary images for the respective change areas, by applying a common labeling method to the detection result 71.

In other words, when a detection result includes a plurality of change areas, the foreground area detection unit 121 generates a plurality of binary images in such a way that the respective change areas are included in separate binary images.

Then, based on preregistered rack area information and each of the plurality of binary images, the foreground area detection unit 121 determines whether or not a change area is a area where a change related to a change in a goods is detected.

The rack area information indicates a area where a goods is displayed in a display rack 3. Since the goods monitoring system 1 monitors a goods on a display rack 3, a area where the goods is displayed, the area being indicated by the rack area information, is also referred to as a monitoring target area, and the rack area information is also referred to as monitored area information. For example, the rack area information may be a binary image expressing a pixel value of a monitoring target area of a display rack 3 being a monitoring target as 255 and the remaining area as 0, the binary image being an image having the same size as a captured image acquired by the first acquisition unit 110. Further, for example, there may be one or a plurality of monitoring target areas included in the rack area information. For example, the rack area information may be previously stored in a storage unit 140. The rack area information includes information for specifying a display rack 3 included in a captured image acquired by the first acquisition unit 110.

For example, by use of rack area information 75 related to a display rack 3 included in the captured image acquired by the first acquisition unit 110, as illustrated in FIG. 18, the foreground area detection unit 121 performs a logical conjunction operation with the detection result 71A, the detection result 71B, or the detection result 71C for each corresponding pixel. Since a monitoring target area is represented in white in the rack area information 75, as illustrated in FIG. 18, the rack area information 75 includes six monitoring target areas.

An operation result 76A illustrated in FIG. 19 is a result of the logical conjunction operation on the rack area information 75 and the detection result 71A, an operation result 76B is a result of the logical conjunction operation on the rack area information 75 and the detection result 71B, and an operation result 76C is a result of the logical conjunction operation on the rack area information 75 and the detection result 71C.

An object other than a goods, such as a person or a cart, extends over a plurality of rack areas, and therefore as a result of the logical conjunction operation on the detection result 71A and the rack area information 75, a part (white part) with a pixel value 255 indicating a change area is divided into a plurality of areas as is the case with the operation result 76A illustrated on the left side of FIG. 19. On the other hand, a part (white part) indicating a change area in each of the operation result 76B and the operation result 76C does not change from each of the detection result 71B and the detection result 71C, respectively, and is a continuous area (a set of pixels with a pixel value 255, at least one of pixels adjacent to each pixel being a pixel with a pixel value 255). A goods displayed in a display area (monitoring target area) of a display rack 3 does not extend over a plurality of monitoring target areas. Accordingly, when a change area is divided into a plurality of areas as the case with the operation result 76A, the foreground area detection unit 121 determines that a change to the change area is a change not caused by a goods and does not include the change in a detection result provided for the classification unit 130. In other words, the foreground area detection unit 121 provides the detection result 71B and the detection result 71C for the classification unit 130.

Consequently, the classification unit 130 can perform the classification processing on a change to a goods displayed on a display rack 3 and therefore can prevent degradation in classification accuracy of a change to a goods due to an effect of an object other than a goods. Further, the foreground area detection unit 121 can make a classification that a change in a change area is a change due to an object other than a goods before the classification unit 130 performs the classification processing, and therefore an amount of processing by the classification unit 130 can be reduced.

<Seventh Example Embodiment>

A seventh example embodiment of the present disclosure is described below. Each of the image processing device according to the aforementioned first to sixth example embodiments may further include an evaluation unit evaluating a classification result. A component having the same function as a component included in a drawing described in each of the aforementioned example embodiments is given the same reference sign, and description thereof is omitted.

Figure 20:
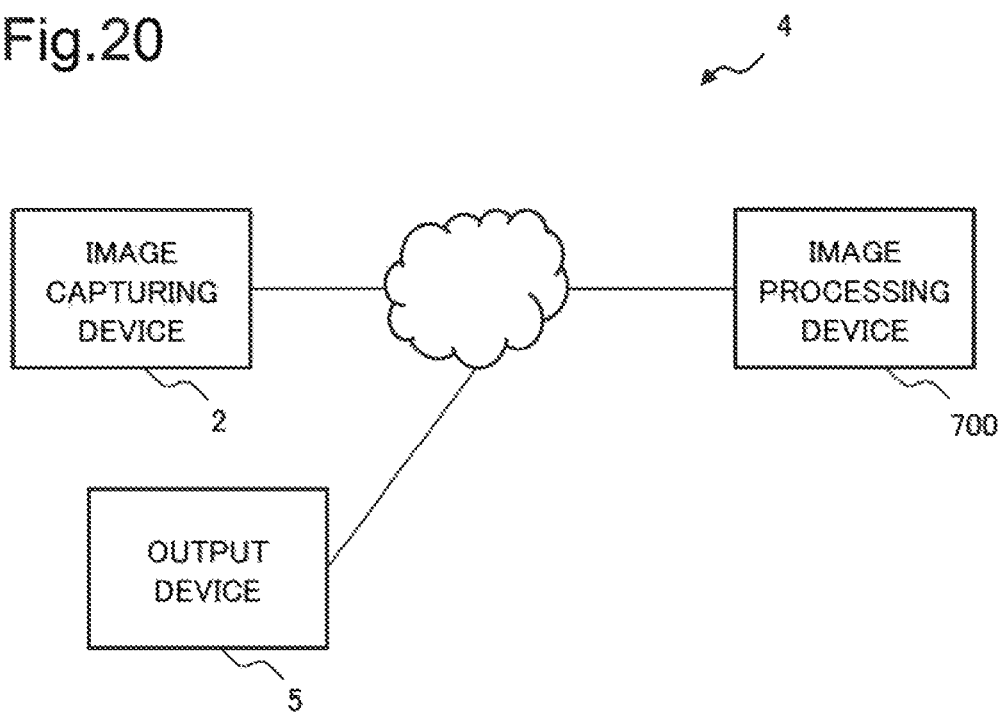
FIG. 20 shows a diagram illustrating a configuration example of a goods monitoring system including an image processing device according to a seventh example embodiment.

FIG. 20 shows a diagram illustrating a configuration example of a goods monitoring system 4 including an image processing device 700 according to the present example embodiment. As illustrated in FIG. 20, the goods monitoring system 4 includes the image processing device 700, an image capturing device 2, and an output device 5. The image processing device 700 is communicably connected to the image capturing device 2 and the output device 5. While the image processing device 700 is described on an assumption that the image processing device 700 is configured to be separate from the image capturing device 2 and the output device 5, according to the present example embodiment, the image processing device 700 may be configured to be built into the image capturing device 2 or may be configured to be built into the output device 5.

For example, the output device 5 may be a display device such as a display or a point of sales system (POS) terminal. Further, without being limited to the above, the output device 5 may be a speaker or a mobile terminal.

Figure 21:
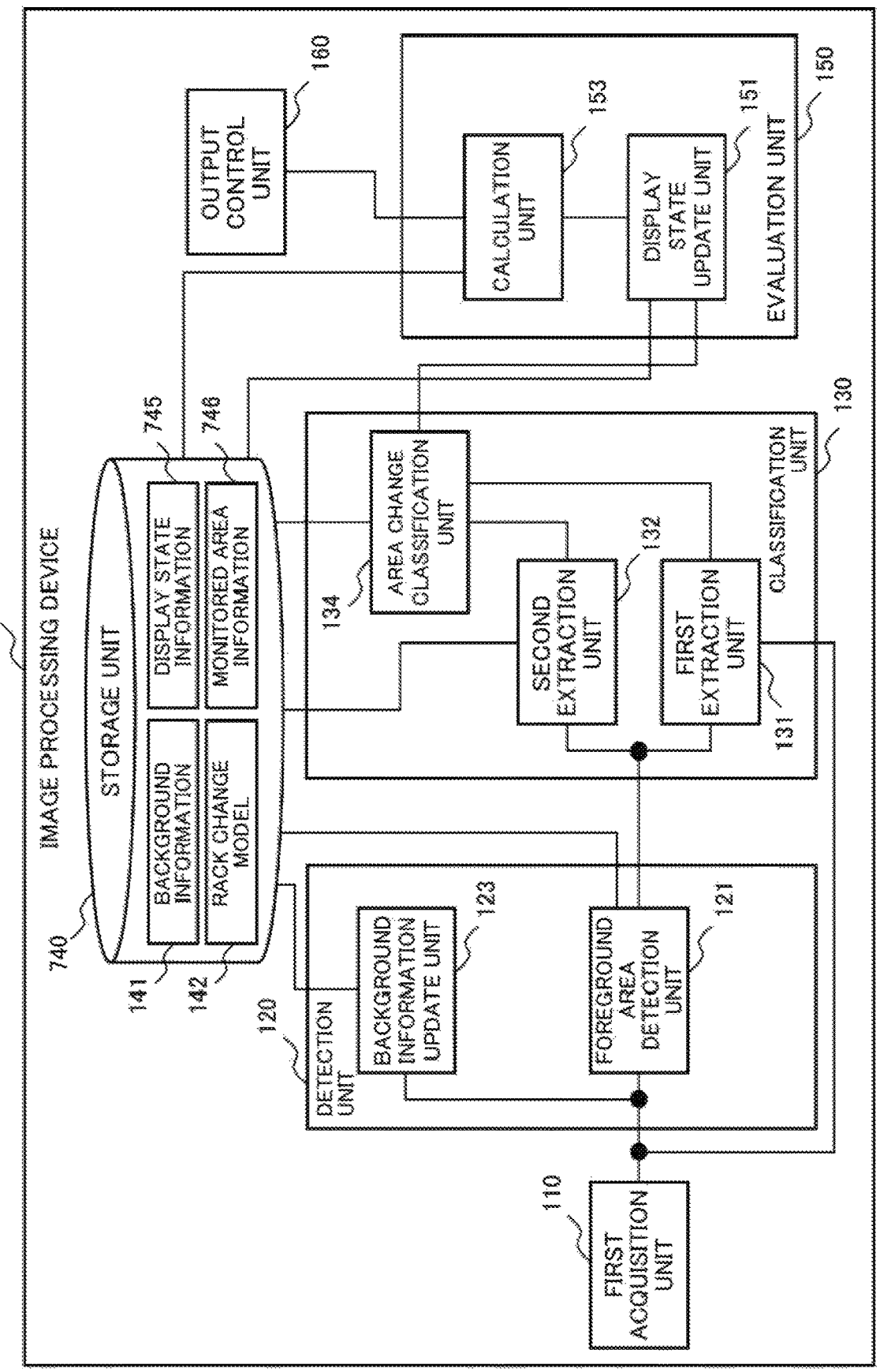
FIG. 21 shows a functional block diagram illustrating an example of a functional configuration of the image processing device according to the seventh example embodiment.

FIG. 21 shows a functional block diagram illustrating an example of a functional configuration of the image processing device 700 according to the present example embodiment. While a configuration further including an evaluation unit 150 and an output control unit 160 in the image processing device 100 according to the first example embodiment is described in the present example embodiment, the configuration may include an evaluation unit in the image processing device (200, 300, 400, 500, 600) according to each of the second to sixth example embodiments.

The image processing device 700 includes a first acquisition unit 110, a detection unit 120, a classification unit 130, a storage unit 740, the evaluation unit 150, and an output control unit 160. The storage unit 740 stores background information 141 and a rack change model 142, similarly to the storage unit 140. Further, the storage unit 740 stores display state information 745 and monitored area information 746. A storage unit storing the display state information 745 and the monitored area information 746 may be a storage unit different from a storage unit storing the background information 141 and the rack change model 142. Further, the display state information 745 and the monitored area information 746 may be stored in separate storage units.

The classification unit 130 according to the present example embodiment outputs a classification result, similarly to the aforementioned first example embodiment. At this time, for example, it is preferable that the classification unit 130 output a classification result acquired by including, in the classification result 60 illustrated in FIG. 6, information indicating a change type of a change area, information (referred to as change area information) indicating a rectangle circumscribed on the change area on a captured image acquired by the first acquisition unit 110, a binary image being a detection result of the change area output by the detection unit 120, and information about a display rack 3 included in the captured image.

For example, change area information may be composed of x coordinate values and y coordinate values of four corners of a rectangle circumscribed on a area of interest or may be composed of an x coordinate and a y coordinate indicating at least one corner out of the four corners of the circumscribed rectangle, and a width and a height of the circumscribed rectangle. Change area information is not limited to information indicating a rectangle, and may be information indicating another shape or may be information indicating an outline enclosing a change area.

Information about a display rack 3 included in a captured image may be information indicating a position where a captured image is captured, information indicating a position of the display rack 3, or an identifier by which the display rack 3 can be specified.

The display state information 745 indicates a display state of a goods on a display rack 3. For example, the display state information 745 may be a binary image expressing a pixel value of a area where the goods exists as 255 and the remaining area as 0, the binary image being an image having the same size as a captured image acquired by the first acquisition unit 110. Further, for example, an initial value of the display state information 745 may be previously given. The display state information 745 includes information for specifying a display rack 3. Information for specifying a display rack 3 may be information indicating a position of the image capturing device 2 capturing the display rack 3, information indicating a position of the display rack 3, or an identifier by which the display rack 3 can be specified.

The monitored area information 746 indicates a area of a display rack 3 being a monitoring target. For example, the monitored area information 746 may be a binary image expressing a pixel value of a area of the display rack 3 being a monitoring target (referred to as monitoring target area) as 255 and the remaining area as 0, the binary image being an image having the same size as a captured image acquired by the first acquisition unit 110. For example, the monitored area information 746 is information similar to the aforementioned rack area information 75. Further, for example, there may be one or a plurality of monitoring target areas included in the monitored area information 746. Further, for example, the monitored area information 746 may be previously given. The monitored area information 746 includes information for specifying a display rack 3, similarly to the display state information 745.

The evaluation unit 150 evaluates a display state of a goods on a display rack 3, from a classification result and display state information 745 including information for specifying a display rack 3 related to information about the display rack 3 included in a captured image included in the classification result. Specifically, the evaluation unit 150 includes a display state update unit 151 and a calculation unit 153, as illustrated in FIG. 21.

The display state update unit 151 receives a classification result from the classification unit 130. As described above, a classification result includes information indicating a change type of a change area, change area information, a detection result, and information about a display rack 3 included in a captured image. The display state update unit 151 specifies display state information 745 including information for specifying a display rack 3 related to information about the display rack 3 included in the captured image, in the display state information 745 stored in the storage unit 740. For example, when the information about the display rack 3 included in the captured image is information indicating a position where the captured image is captured, the display state update unit 151 specifies display state information 745 including information indicating the same position. Further, for example, when the information about the display rack 3 included in the captured image is information indicating a position of the display rack 3, the display state update unit 151 specifies display state information 745 including information indicating the same position. Further, for example, when the information about the display rack 3 included in the captured image is an identifier by which the display rack 3 can be specified, the display state update unit 151 specifies display state information 745 including the same identifier.

The display state update unit 151 extracts, from the display state information 745, an image of a part corresponding to a rectangular area indicated by change area information included in a classification result. Then, the display state update unit 151 specifies, from the extracted image, a pixel corresponding to a change area indicated by a detection result included in the classification result. The display state update unit 151 updates a value of the specified pixel in the display state information 745, based on information indicating a change type of the change area included in the classification result. For example, the display state update unit 151 sets the value of the pixel to 0 when the change type is "a change due to a goods being no longer included on a display rack 3," sets the value of the pixel to 255 when the change type is "a change due to a goods being newly included on a display rack 3," and does not change the value of the pixel in the other cases.

The display state update unit 151 provides the updated display state information 745 for the calculation unit 153. Further, the display state update unit 151 stores the updated display state information 745 into the storage unit 740.

The calculation unit 153 receives updated display state information 745 from the display state update unit 151. Further, the calculation unit 153 acquires monitored area information 746 related to a display rack 3 related to the updated display state information 745 from the storage unit 740. Then, the calculation unit 153 evaluates a display state of the display rack 3 by calculating an amount of display of a goods being an evaluation indicator indicating a display state of the display rack 3.

For each monitoring target area included in the monitored area information 746, the calculation unit 153 extracts an image of a area of the updated display state information 745 corresponding to the monitoring target area. Then, the calculation unit 153 counts pixels having a pixel value 255 in the extracted image. The calculation unit 153 calculates an area of each monitoring target area and calculates an amount of display for each monitoring target area with a number of pixels having a pixel value 255 as a numerator and an area of the monitoring target area as a denominator. Then, the calculation unit 153 provides the calculated amount of display for the output control unit 160 along with information indicating the monitoring target area. Information indicating a monitoring target area is information including information indicating a display rack 3 being a monitoring target and information indicating a position of the monitoring target area in the monitored area information 746.

The output control unit 160 outputs information about a display state of a goods to the output device, based on an evaluation result by the evaluation unit 150. Specifically, the output control unit 160 receives an amount of display and information indicating a monitoring target area from the calculation unit 153. When the amount of display of the monitoring target area is less than or equal to a predetermined threshold value, that is, when there is a deficiency in a display state of a goods, the output control unit 160 transmits a control signal controlling the output device 5 to output information indicating existence of the deficiency. For example, when the output device 5 is a mobile terminal held by a clerk, the output control unit 160 transmits, to the mobile terminal, a control signal causing the mobile terminal to output existence of a deficiency in a display state in a graspable manner for the clerk. The mobile terminal receiving the control signal may output information indicating the existence of the deficiency in a graspable manner for the clerk. Further, for example, when the output device 5 is a display device in a backyard of a store, the output control unit 160 transmits, to the display device, a control signal causing the display device to output existence of a deficiency in a display state in a graspable manner for a clerk.

Thus, for example, a clerk at a store can readily grasp a display state.

Figure 22:
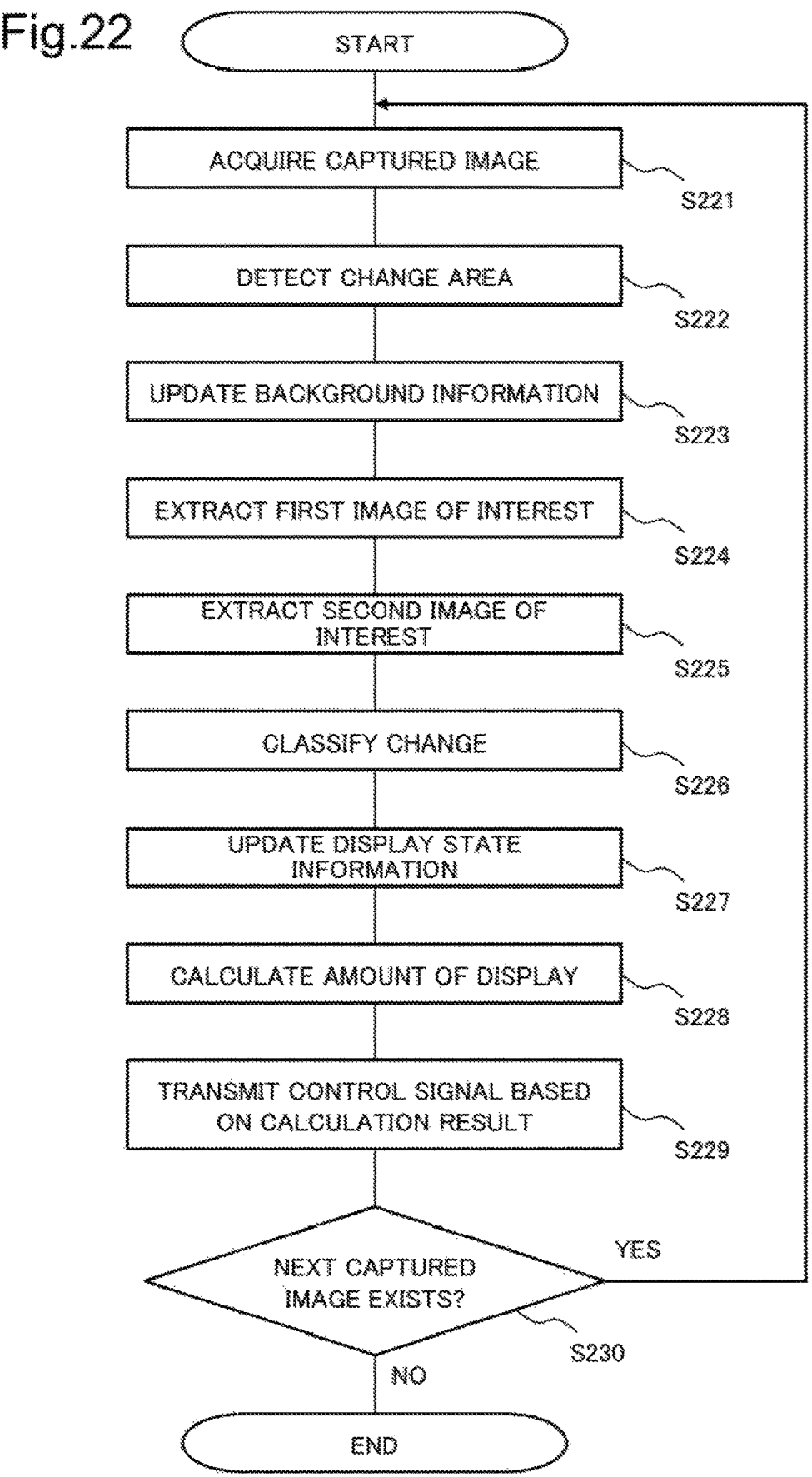
FIG. 22 shows a flowchart illustrating an example of an operation flow in the image processing device according to the seventh example embodiment.

FIG. 22 shows a flowchart illustrating an example of an operation flow in the image processing device 700 according to the present example embodiment. The image processing device 700 executes Steps S221 to S226 being processing similar to Steps S51 to S56 described in FIG. 5.

Figure 23:
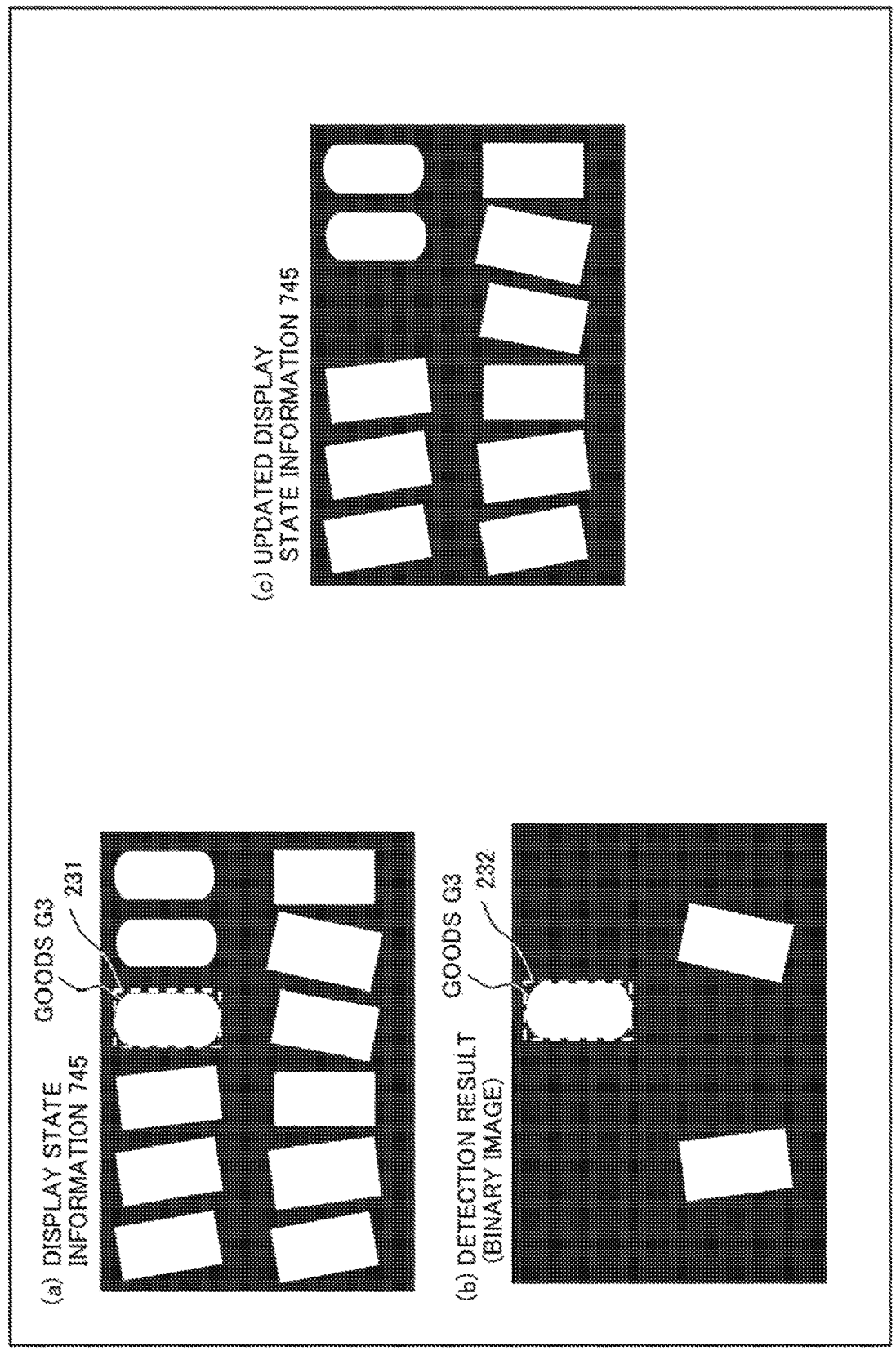
FIG. 23 shows a diagram illustrating an example of display state information stored in a storage unit and an example of the updated display state information.

After Step S226 ends, the display state update unit 151 updates display state information 745 indicating a display state of a goods, based on the classification result (Step S227). Update processing of display state information 745 by the display state update unit 151 is further described with reference to FIG. 23. FIG. 23 shows a diagram illustrating an example of display state information 745 stored in the storage unit 740 and an example of the updated display state information 745.

A detection result illustrated in a diagram (b) in FIG. 23 is the same image as the detection result illustrated in FIG. 4. In this example, an image related to the goods G3 illustrated in FIG. 4 is described. The display state update unit 151 extracts an image of a part corresponding to a rectangular area indicated by change area information included in the classification result, from display state information 745 as illustrated in a diagram (a) in FIG. 23. It is assumed that the change area information indicates a rectangle 231 in broken lines circumscribed on the goods G3 illustrated in the diagram (a) in FIG. 23.

From the extracted image, the display state update unit 151 specifies a pixel corresponding to a change area indicated by the detection result included in the classification result. Since a pixel value of the change area is 255, the display state update unit 151 specifies a pixel in a white part from an image of the detection result part of a rectangle 232 corresponding to the rectangle 231.

Then, based on information indicating a change type of the change area included in the classification result, the display state update unit 151 updates the value of the specified pixel in the display state information 745. For example, the display state update unit 151 sets the value of the pixel to 0 when the change type is "a change due to a goods being no longer included on a display rack 3," sets the value of the pixel to 255 when the change type is "a change due to a goods being newly included on a display rack 3," and does not change the value of the pixel in the other cases. Since the change in the goods G3 in the change area is "a change due to a goods being no longer included on a display rack 3," the display state update unit 151 sets a value of a pixel in the specified change area part out of pixels in the rectangle 231 in the display state information 745 to 0. Then, the display state update unit 151 outputs updated display state information 745 as illustrated in a diagram (c) in FIG. 23.

The display state update unit 151 stores the updated display state information 745 into the storage unit 740. Further, the display state update unit 151 provides the updated display state information 745 for the calculation unit 153.

Figure 24:
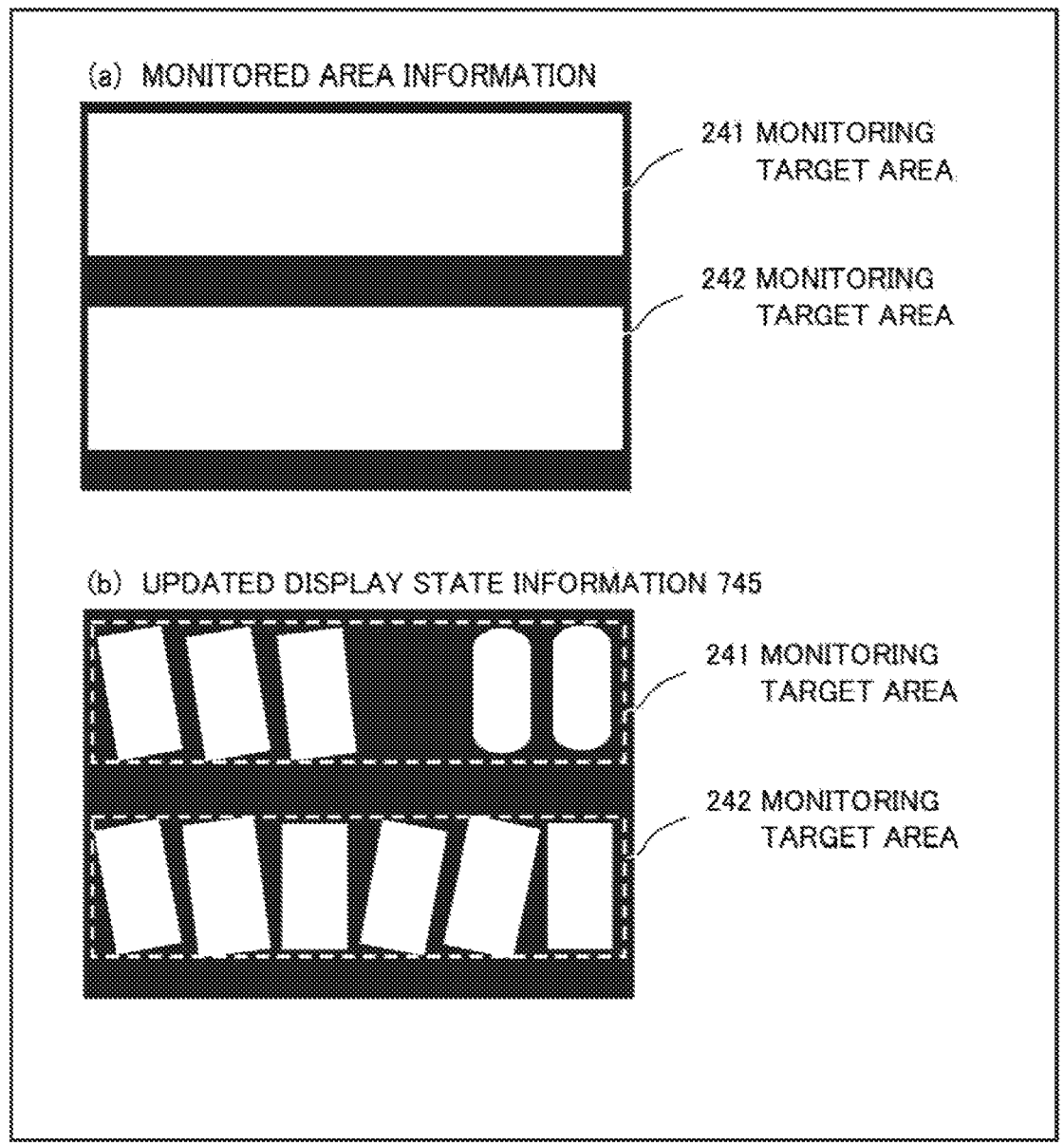
FIG. 24 shows a diagram for illustrating an operation of a calculation unit.

The calculation unit 153 calculates an amount of display of a goods, based on the updated display state information 745 provided from the display state update unit 151 and monitored area information 746 stored in the storage unit 740 (Step S228). An operation of the calculation unit 153 is further described with reference to FIG. 24. FIG. 24 shows a diagram for illustrating an operation of the calculation unit 153. A diagram (a) in FIG. 24 illustrating an example of monitored area information 746 stored in the storage unit 740. As illustrated in the diagram (a) in FIG. 24, the monitored area information 746 includes two monitoring target areas (241, 242). Further, a diagram (b) in FIG. 24 is the updated display state information 745 illustrated in FIG. 23 on which outlines in broken lines representing the monitoring target areas are superposed. The calculation unit 153 counts pixels with a pixel value 255 in the updated display state information 745 included in the monitoring target area 241. Then, the calculation unit 153 calculates an amount of display with an area of the monitoring target area 241 including the goods G3 as a denominator and the counted number of pixels as a numerator.

Then, the output control unit 160 transmits a control signal based on the calculation result to the output device 5 (Step S229). Then, the image processing device 100 performs processing similar to Step S57 described in FIG. 5 (Step S230).

Figure 25:
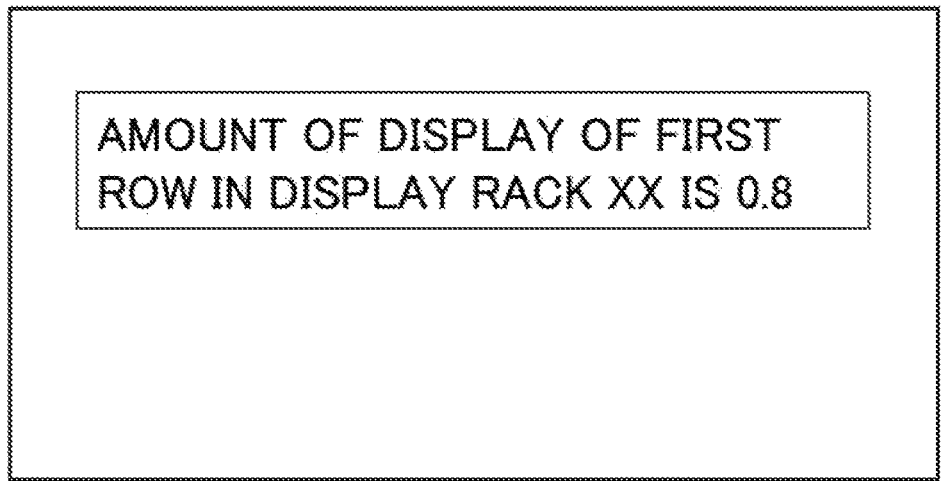
FIG. 25 shows a diagram illustrating an example of an output screen displayed by an output device.
Figure 26:
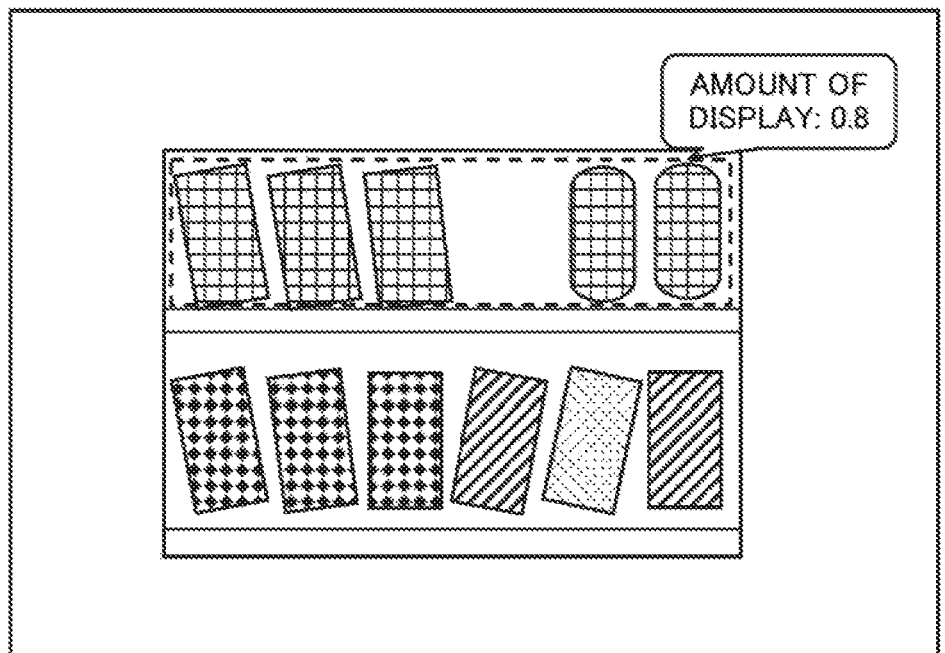
FIG. 26 shows a diagram illustrating another example of an output screen displayed by the output device.

FIG. 25 and FIG. 26 show diagrams illustrating examples of an output screen displayed by the output device 5. When the output device 5 is a display device, the output device 5 may output an output screen 251 including a calculated amount of display as illustrated in FIG. 25, based on a control signal output from the output control unit 160.

Further, the output device 5 may output an output screen 261 as illustrated in FIG. 26, based on a control signal output from the output control unit 160. The output screen illustrated in FIG. 26 is a screen in which an amount of display calculated by the calculation unit 153 is superimposed on the captured image illustrated in FIG. 4.

Further, the calculation unit 153 may store a calculated amount of display in, for example, the storage unit 740 for a predetermined period. At this time, the calculation unit 153 may store an amount of display for each monitoring target area in association with a classification result. For example, it is assumed that a customer temporarily takes a goods in his/her hand, moving to another place, and subsequently returns the goods in his/her hand to the same rack without purchasing the goods. Thus, when a goods is not purchased, a POS cannot manage an interest expressed in the goods by the customer. However, when a customer temporarily takes a goods in his/her hand and moves to another place, the detection unit 120 can detect that the goods disappears from a display rack 3, and therefore the calculation unit 153 calculates an amount of display lower than an amount of display before the customer takes out the goods from the display rack 3. Subsequently, when the goods is returned to the display rack 3, the calculation unit 153 calculates an amount of display with a higher value compared with an amount of display before the goods is returned to the display rack 3. By storing such a change in an amount of display for a predetermined period and comparing the amount of display with sales data transmitted from a POS, the calculation unit 153 may provide a place of a goods in which the customer expresses interest for the output control unit 160.

Further, for example, it is assumed that a customer temporarily takes a goods in his/her hand and immediately returns the goods taken in his/her hand to the same rack. In this case, there is a high possibility that an appearance of the goods changes. However, an amount of display of the display rack 3 does not change. However, the calculation unit 153 may store an amount of display for each monitoring target area in association with a classification result and provide an amount of display in a predetermined period for the output control unit 160.

Consequently, for example, the output control unit 160 can output a degree of interest of a customer in a goods or the like that cannot be grasped by a POS to the output device 5. Accordingly, the image processing device 700 according to the present example embodiment can provide data effective in marketing.

Further, for example, it is assumed that a customer places a goods taken in his/her hand from a display rack 3 on a different display rack 3. In this case, the calculation unit 153 calculates an amount of display with a greater value than that of an amount of display before the goods is placed. In such a case, the output control unit 160 may generate a control signal causing the output device 5 to output information indicating a possibility that a different goods is placed, from an accumulated amount of display and the calculated amount of display.

Further, the evaluation unit 150 may update the display state information 745 to an initial state at a predetermined timing. For example, an initial state of the display state information 745 is a state generated from a previously created rack space allocation or the same state as the background information 141. For example, a predetermined timing is a time when replenishment work of a goods by a clerk is performed. By continuing updating the display state information 745, an error from an actual display state may increase. However, by updating the display state information 745 to an initial state at a predetermined timing by the evaluation unit 150, increase in an error can be prevented. Consequently, the evaluation unit 150 can prevent occurrence of an error in a calculated amount of display.

As described above, the image processing device 700 according to the present example embodiment further evaluates a display state by calculating an amount of display for evaluating the display state, in addition to the function of the image processing device 100. Consequently, the image processing device 700 further provides an effect that, for example, a clerk at a store can readily grasp a display state, based on a display state, in addition to the effect provided by the aforementioned image processing device 100.

<Eighth Example Embodiment>

An eighth example embodiment of the present disclosure is described with reference to drawings. A minimum configuration according to the present example embodiment for resolving the problem to be resolved by the present disclosure is described.

Figure 27:
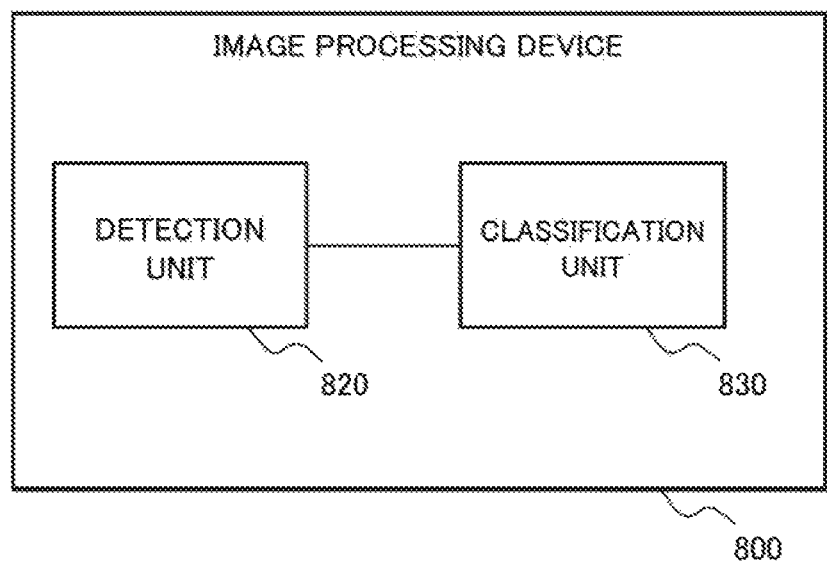
FIG. 27 shows a functional block diagram illustrating an example of a functional configuration of an image processing device according to an eighth example embodiment.

FIG. 27 shows a functional block diagram illustrating an example of a functional configuration of an image processing device 800 according to the present example embodiment. As illustrated in FIG. 27, the image processing device 800 includes a detection unit 820 and a classification unit 830.

The detection unit 820 has the function of the detection unit according to each of the aforementioned example embodiments. The detection unit 820 detects a change area related to a display rack from a captured image in which an image of the display rack is captured. For example, the detection unit 820 detects a change area by comparing a captured image with background information indicating an image captured before an image capturing time of the captured image. The detection unit 820 provides information indicating the detected change area for the classification unit 830.

The classification unit 830 has the function of the classification unit according to each of the aforementioned example embodiments. The classification unit 830 classifies a change related to a display rack in a change area, based on a previously learned model of a change related to the display rack or distance information indicating an image captured before an image capturing time of a captured image. For example, by comparing a previously learned model of a change related to a display rack with a change in a detected change area, the classification unit 830 classifies a change in the change area as one of a plurality of change types. For example, change types include "a change due to a goods being no longer included on a display rack," "a change due to a goods being newly included on a display rack," "a change due to a change in appearance of a goods displayed on a display rack," "a change due to existence of a person in front of a display rack," "a change due to existence of a shopping cart in front of a display rack," and "a change due to a change in lighting."

Figure 28:
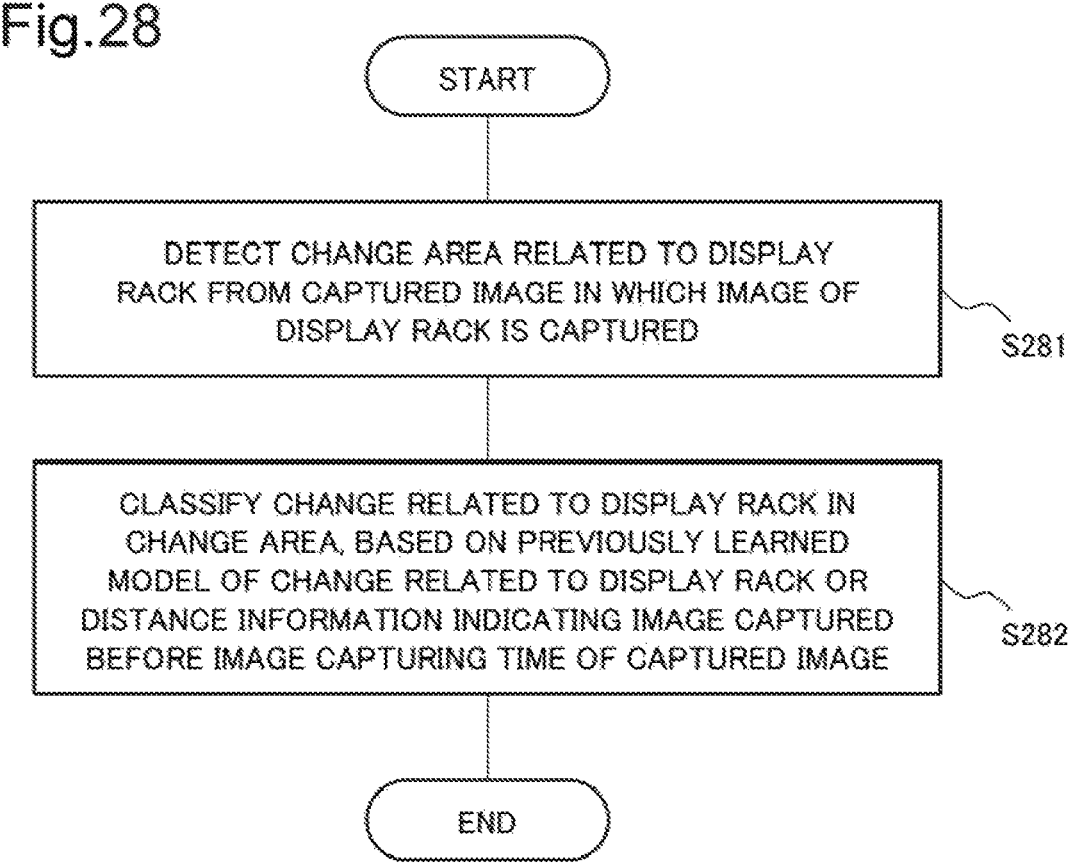
FIG. 28 shows a flowchart illustrating an example of an operation flow in the image processing device according to the eighth example embodiment.

FIG. 28 shows a flowchart illustrating an operation example of the image processing device 800 according to the present example embodiment. The detection unit 820 detects a change area related to a display rack from a captured image in which an image of the display rack is captured (Step S281).

Then, the classification unit 830 classifies a change related to the display rack in the change area, based on a previously learned model of a change related to the display rack or distance information indicating an image captured before an image capturing time of the captured image (Step S282).

As described above, the image processing device 800 according to the present example embodiment can specify not only a change in a goods on a display rack but also the type of the change. Accordingly, the image processing device 800 can more accurately determine a state of the display rack such as a state in which a goods is taken out or a state in which the display rack is replenished.

Further, in each of the aforementioned example embodiments, a captured image captured by the image capturing device 2 may be, for example, a captured image in which an image of goods piled up on a wagon is captured. The image processing device can detect a change area by comparing the captured image in which an image of the goods piled up on the wagon is captured with a background image. Accordingly, the image processing device according to each of the example embodiments of the present disclosure may use captured images in which images of goods displayed in various display methods are captured, without being limited to a display rack on which goods are displayed in such a way that all the faces of the goods are visible.

(Hardware Configuration)

Figure 29:
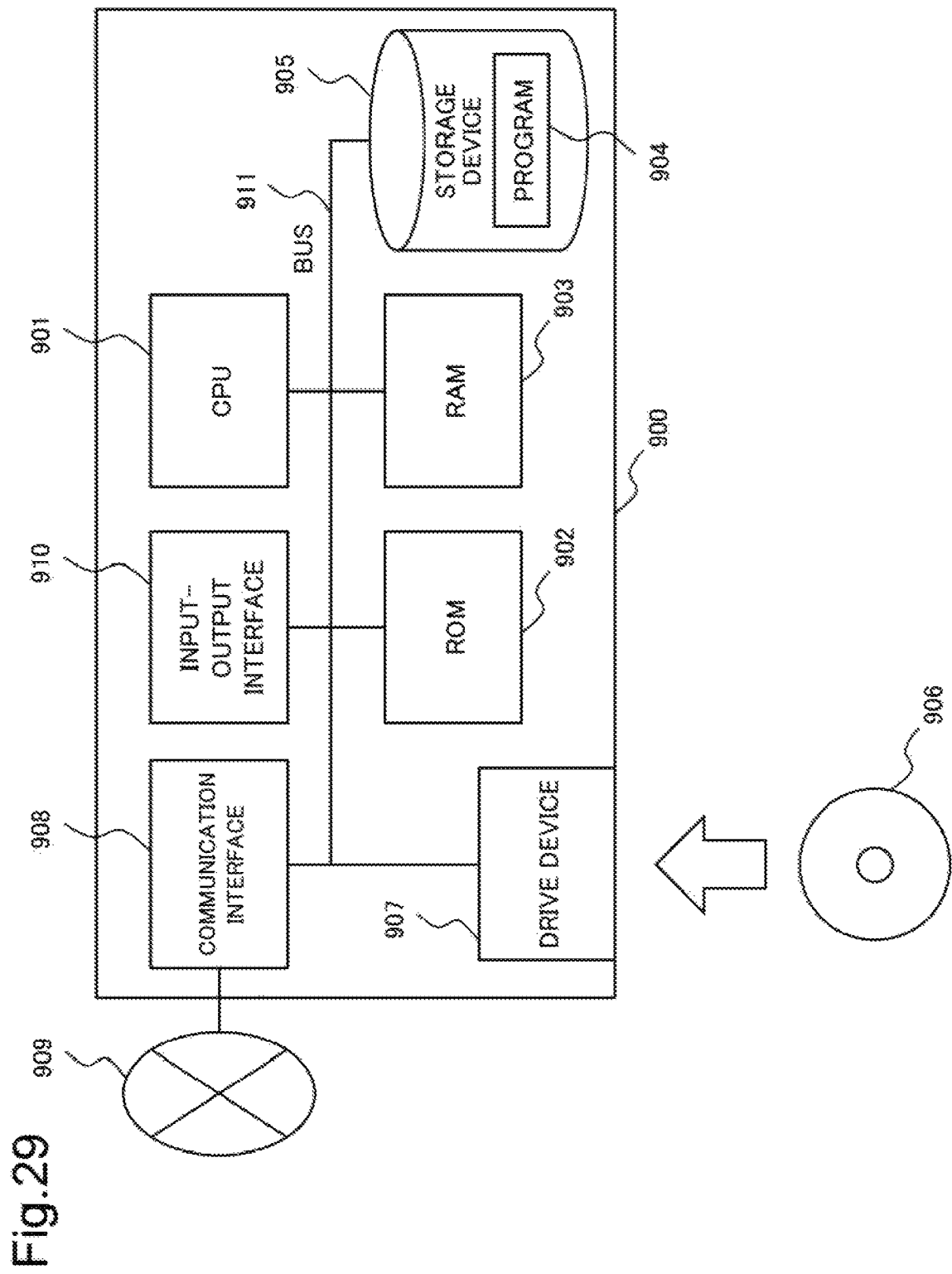
FIG. 29 shows a diagram exemplarily illustrating a hardware configuration of a computer (information processing device) capable of providing each example embodiment of the present disclosure.

Each component in each device according to each example embodiment of the present disclosure represents a function-based block. For example, a part or the whole of each component in each device is provided by an arbitrary combination of an information processing device 900 and a program, as illustrated in FIG. 29. FIG. 29 is a block diagram illustrating an example of a hardware configuration of the information processing device 900 providing each component in each device. An example of the information processing device 900 includes the following configuration.

A central processing unit (CPU) 901

A read only memory (ROM) 902

A random access memory (RAM) 903

A program 904 loaded on the RAM 903

A storage device 905 storing the program 904

A drive device 907 for reading and writing of a recording medium 906

A communication interface 908 connected to a communication network 909

An input-output interface 910 inputting and outputting data

A bus 911 connecting each component

Each component in each device according to each example embodiment is provided by the CPU 901 acquiring and executing the program 904 providing the function of the component. For example, the program 904 providing the function of each component in each device is previously stored in the storage device 905 or the ROM 902, and is loaded onto the RAM 903 and executed by the CPU 901 as needed. The program 904 may be provided for the CPU 901 through the communication network 909, or may be previously stored in the recording medium 906, be read by the drive device 907, and be provided for the CPU 901.

There are various modified examples of a method of providing each device. For example, each device may be provided by an arbitrary combination of an information processing device 900 and a program, the combination being separate for each component. Further, a plurality of components included in each device may be provided by an arbitrary combination of a single information processing device 900 and a program.

Further, a part or the whole of each component in each device is provided by another general-purpose or dedicated circuit, a processor, or the like, or a combination thereof. The above may be configured with a single chip or may be configured with a plurality of chips connected through a bus.

A part or the whole of each component in each device may be provided by a combination of the aforementioned circuit or the like, and a program.

When a part or the whole of each component in each device is provided by a plurality of information processing devices, circuits, or the like, the plurality of information processing devices, circuits, or the like may be arranged in a concentrated manner or be arranged in a distributed manner. For example, the respective information processing devices, circuits, or the like may be provided in a form of being connected with one another through a communication network such as a client-server system or a cloud computing system.

The respective aforementioned example embodiments are preferred example embodiments of the present disclosure, and the scope of the present disclosure is not limited to the respective aforementioned example embodiments; and a person skilled in the art may make example embodiments which include various changes through modifying and substituting the respective aforementioned example embodiments without departing from the spirit and scope of the present disclosure.

The whole or part of the example embodiments disclosed above can be described as, but not limited to, the following supplementary notes.

(Supplementary Note 1)

An image processing device comprising:

detection means configured to detect a change area related to a display rack from a captured image in which an image of the display rack is captured; and classification means configured to classify a change related to the display rack in the change area, based on a previously learned model of the change related to the display rack or distance information indicating an image captured before an image capturing time of the captured image.

(Supplementary Note 2)

The image processing device according to supplementary note 1, wherein the captured image is a color image, the detection means detects the change area by comparing the captured image with background information indicating the image captured before the image capturing time of the captured image, and the classification means classifies the change related to the display rack in the change area, based on the previously learned model.

(Supplementary note 3)

The image processing device according to supplementary note 1, wherein the captured image includes a first captured image being a color image and a second captured image being a distance image in which an image of an image capturing range of the first captured image is captured within a predetermined time from the image capturing time of the first captured image, the detection means detects the change area by comparing the first captured image with background information indicating the image captured before the image capturing time of the first captured image, and the classification means classifies the change related to the display rack, based on a comparison result between a value of each pixel included in the second captured image and a value of each pixel in the distance information captured before the image capturing time of the second captured image.

(Supplementary note 4)

The image processing device according to supplementary note 1, wherein the captured image is a distance image, the detection means detects the change area by comparing the captured image with background information indicating the image captured before the image capturing time of the captured image, and the classification means classifies the change related to the display rack, based on a comparison result between a value of each pixel included in the captured image and a value of each pixel in the distance information.

(Supplementary Note 5)

The image processing device according to supplementary note 3 or 4, wherein the classification means classifies the change related to the display rack in the change area as a type related to a change in a goods displayed on the display rack or a type related to a change due to an object other than a goods displayed on the display rack, based on a comparison result between a value of each pixel included in the captured image being the distance image, and a distance between the image capturing device and the display rack.

(Supplementary Note 6)

The image processing device according to any one of supplementary notes 2 to 5, wherein the detection means tracks the change area among a plurality of the captured images, and the classification means classifies the change related to the display rack, based on a tracking result.

(Supplementary Note 7)

The image processing device according to supplementary note 6, wherein the detection means includes background information update means configured to update the background information, based on the captured image used when detecting the change area, and the background information, and, when the tracking result of the change area satisfies a first predetermined condition, the background information update means updates a area other than a area corresponding to the change area, in the background information.

(Supplementary Note 8)

The image processing device according to supplementary note 7, wherein, when the tracking result of the change area satisfies a second predetermined condition, the background information update means updates a area corresponding to the change area, in the background information.

(Supplementary Note 9)

The image processing device according to any one of supplementary notes 1 to 8, wherein, based on the change area and rack area information indicating a rack area in the display rack where a goods is displayed, the detection means determines whether or not the change area is included in a plurality of the rack areas, and, when the change area is included in one of the rack areas, the classification means classifies the change related to the display rack in the change area as a type related to a change in a goods displayed on the display rack.

(Supplementary Note 10)

The image processing device according to any one of supplementary notes 1 to 9, further comprising evaluation means configured to evaluate a display state of a goods, based on a classification result by the classification means.

(Supplementary Note 11)

The image processing device according to supplementary note 10, wherein the evaluation means calculates an amount of display of a goods, based on the classification result, information about the change area, and monitored area information indicating a target area where the display state of the goods is monitored in the captured image.

(Supplementary Note 12)

The image processing device according to supplementary note 11, wherein the evaluation means evaluates the display state of the goods, based on a transition of the amount of display.

(Supplementary Note 13)

The image processing device according to any one of supplementary notes 10 to 12, further comprising output control means configured to output information about the display state of the goods to an output device, based on an evaluation result by the evaluation means.

(Supplementary Note 14)

An image processing method comprising:

detecting a change area related to a display rack from a captured image in which an image of the display rack is captured; and classifying a change related to the display rack in the change area, based on a previously learned model of the change related to the display rack or distance information indicating an image captured before an image capturing time of the captured image.

(Supplementary Note 15)

The image processing method according to supplementary note 14, wherein the captured image is a color image, and the image processing method further comprises:

detecting the change area by comparing the captured image with background information indicating the image captured before the image capturing time of the captured image; and classifying the change related to the display rack in the change area, based on the previously learned model.

(Supplementary Note 16)

A computer-readable non-transitory recording medium recorded with a program causing a computer to execute:

detection processing of detecting a change area related to a display rack from a captured image in which an image of the display rack is captured; and classification processing of classifying a change related to the display rack in the change area, based on a previously learned model of the change related to the display rack or distance information indicating an image captured before an image capturing time of the captured image.

(Supplementary Note 17)

The recording medium according to supplementary note 16, wherein the captured image is a color image, the change area is detected by comparing the captured image with background information indicating the image captured before the image capturing time of the captured image, in the detection processing, and the change related to the display rack in the change area is classified, based on the previously learned model, in the classification processing.

REFERENCE SIGNS LIST

1 Goods monitoring system
2 Image capturing device
3 Display rack
4 Goods monitoring system
5 Output device
100 Image processing device
110 First acquisition unit
120 Detection unit
121 Foreground area detection unit
123 Background information update unit
130 Classification unit
131 First extraction unit
132 Second extraction unit
134 Area change classification unit
140 Storage unit
141 Background information
142 Rack change model
150 Evaluation unit
151 Display state update unit
153 Calculation unit
160 Output control unit
200 Image processing device
220 Detection unit
221 Foreground area detection unit
223 Background information update unit
224 Foreground area tracking unit
240 Storage unit
243 Foreground area information
300 Image processing device
330 Classification unit
331 First extraction unit
332 Second extraction unit
334 Area change classification unit
335 Distance information update unit
340 Storage unit
344 Distance information
350 Second acquisition unit
400 Image processing device
430 Classification unit
440 Storage unit
435 Distance information update unit
500 Image processing device
510 First acquisition unit
520 Detection unit
521 Foreground area detection unit
523 Background information update unit
530 Classification unit
531 First extraction unit 532 Second extraction unit
540 Storage unit
541 Background information
600 Image processing device
620 Detection unit
640 Storage unit
700 Image processing device
740 Storage unit
745 Display state information
746 Monitored area information
800 Image processing device
820 Detection unit
830 Classification unit

What is claimed is:

1. An image processing device comprising a processor configured to:
   detect a change area related to a display rack from a captured image in which an image of the display rack is captured;
   generate binary image data indicating the change area;
   determine whether or not the change area is included in a plurality of rack areas, by comparing the generated binary image data and rack area information that is a binary image and indicates the rack areas in the display rack where a good is displayed;
   classify a change related to the display rack in the change area, based on a previously learned model of the change related to the display rack, or based on distance information indicating another image captured before an image capturing time of the captured image;
   calculate an amount of display of the good, based on a classification result, information about the change area, and monitored area information indicating a target area where the display state of the good is monitored in the captured image;
   evaluate a display state of the good, based on a transition of the amount of display;
   store the transition of the amount of display for a predetermined period;
   evaluate whether a first amount of display is larger than a second amount of display and the second amount of display is smaller than a third amount of display;
   provide information about a place of the good in which a customer expresses interest to an output device, when the first amount of display is larger than the second amount of display and the second amount of display is smaller than the third amount of display, wherein,
   when the change area is included in one of the rack areas, the processor classifies the change related to the display rack in the change area as a type related to a change in the good displayed on the display rack,
   when the change area is included in a plurality of the rack areas, the processor classifies the change related to the display rack in the change area as a type related to a change in an object other than the good displayed on the display rack, the rack area information being other binary image data indicating the rack areas,
   the first amount of display is included in the transition of the amount of display,
   the second amount of display is included in the transition of the amount of display, the second amount of display is calculated later than the first amount display, and
   the third amount of display is included in the transition of the amount of display, the third amount of display is calculated later than the second amount display.

2. The image processing device according to claim 1, wherein
   the captured image is a color image,
   the processor detects the change area by comparing the captured image with background information indicating the another image captured before the image capturing time of the captured image, and
   the processor classifies the change related to the display rack in the change area, based on the previously learned model.

3. The image processing device according to claim 1, wherein
   the captured image includes a first captured image being a color image and a second captured image being a distance image in which an image of an image capturing range of the first captured image is captured within a predetermined time from an image capturing time of the first captured image,
   the processor detects the change area by comparing the first captured image with background information indicating the image captured before the image capturing time of the first captured image, and
   the processor classifies the change related to the display rack, based on a comparison result between a value of each of a plurality of pixels included in the second captured image and a value of each of a plurality of pixels in the another image captured before an image capturing time of the second captured image.

4. The image processing device according to claim 1, wherein
   the captured image is a distance image,
   the processor detects the change area by comparing the captured image with background information indicating the another image captured before the image capturing time of the captured image, and
   the processor classifies the change related to the display rack, based on a comparison result between a value of each of a plurality of pixels included in the captured image and a value of each of a plurality of pixels in the another image.

5. The image processing device according to claim 3, wherein
   the processor classifies the change related to the display rack in the change area as the type related to the change in the good displayed on the display rack or the type related to the change due to the object other than the good displayed on the display rack, based on a comparison result between a value of each of a plurality of pixels included in the captured image being the distance image, and a distance between an image capturing device and the display rack.

6. The image processing device according to claim 2, wherein
   the captured image is one of a plurality of captured images,
   the processor tracks the change area among the plurality of the captured images, and
   the processor classifies the change related to the display rack, based on a tracking result.

7. The image processing device according to claim 6, wherein
   the processor updates the background information, based on the captured image used when detecting the change area, and the background information, and,
   when the tracking result of the change area satisfies a first predetermined condition, the processor updates an area other than an area corresponding to the change area, in the background information.

8. The image processing device according to claim 7, wherein,
when the tracking result of the change area satisfies a second predetermined condition, the processor updates the area corresponding to the change area, in the background information.

9. The image processing device according to claim 1, wherein the processor is further configured to output information about the display state of the good to an output device, based on an evaluation result.

10. An image processing method comprising:
detecting a change area related to a display rack from a captured image in which an image of the display rack is captured;
generating binary image data indicating the change area;
determining whether or not the change area is included in a plurality of the rack areas, by comparing the generated binary image data and rack area information that is a binary image and indicates the rack areas in the display rack where a good is displayed;
classifying a change related to the display rack in the change area, based on a previously learned model of the change related to the display rack, or based on distance information indicating another image captured before an image capturing time of the captured image;
calculating an amount of display of the good, based on a classification result, information about the change area, and monitored area information indicating a target area where the display state of the good is monitored in the captured image;
evaluating a display state of the good, based on a transition of the amount of display;
storing the transition of the amount of display for a predetermined period;
evaluating whether a first amount of display is larger than a second amount of display and the second amount of display is smaller than a third amount of display; and
providing information about a place of the good in which a customer expresses interest to an output device, when the first amount of display is larger than the second amount of display and the second amount of display is smaller than the third amount of display, wherein,
when the change area is included in one of the rack areas, the change related to the display rack in the change area is classified as a type related to a change in the good displayed on the display rack,
when the change area is included in a plurality of the rack areas, the change related to the display rack in the change area is classified as a type related to a change in an object other than the good displayed on the display rack, the rack area information being other binary image data indicating the rack areas,
the first amount of display is included in the transition of the amount of display,
the second amount of display is included in the transition of the amount of display, the second amount of display is calculated later than the first amount display, and
the third amount of display is included in the transition of the amount of display, the third amount of display is calculated later than the second amount display.

11. The image processing method according to claim 10, wherein
the captured image is a color image, and
the image processing method further comprises:
detecting the change area by comparing the captured image with background information indicating the another image captured before the image capturing time of the captured image; and
classifying the change related to the display rack in the change area, based on the previously learned model.

12. A computer-readable non-transitory recording medium recorded with a program causing a computer to execute processing of:
detecting a change area related to a display rack from a captured image in which an image of the display rack is captured;
generating binary image data indicating the change area;
determining whether or not the change area is included in a plurality of the rack areas, by comparing the generated binary image data and rack area information that is a binary image and indicates the rack areas in the display rack where a good is displayed; and
classifying a change related to the display rack in the change area, based on a previously learned model of the change related to the display rack, or based on distance information indicating another image captured before an image capturing time of the captured image;
calculating an amount of display of the good, based on a classification result, information about the change area, and monitored area information indicating a target area where the display state of the good is monitored in the captured image;
evaluating a display state of the good, based on a transition of the amount of display;
storing the transition of the amount of display for a predetermined period;
evaluating whether a first amount of display is larger than a second amount of display and the second amount of display is smaller than a third amount of display; and
providing information about a place of the good in which a customer expresses interest to an output device, when the first amount of display is larger than the second amount of display and the second amount of display is smaller than the third amount of display, wherein,
when the change area is included in one of the rack areas, the change related to the display rack in the change area is classified as a type related to a change in the good displayed on the display rack,
when the change area is included in a plurality of the rack areas, the change related to the display rack in the change area is classified as a type related to a change in an object other than the good displayed on the display rack, the rack area in formation being other binary image data indicating the rack areas,
the first amount of display is included in the transition of the amount of display,
the second amount of display is included in the transition of the amount of display, the second amount of display is calculated later than the first amount display, and
the third amount of display is included in the transition of the amount of display, the third amount of display is calculated later than the second amount display.

13. The recording medium according to claim 12, wherein the captured image is a color image,
the change area is detected by comparing the captured image with background information indicating the another image captured before the image capturing time of the captured image, in the detection processing, and
the change related to the display rack in the change area is classified, based on the previously learned model, in the classification processing.

14. The image processing device according to claim 1, wherein
  the processor evaluates whether the amount of display does not change, and the change is classified as a change in appearance of the good displayed on the display rack, and
  the processor provides the amount of display for each of a plurality of monitoring target areas in association with a classification result to an output device, in a case that the amount of display does not change, and the change is classified as the change in appearance of the good displayed on the display rack.

15. The image processing device according to claim 1, wherein
  the processor further evaluates whether the amount of display after the good placed on the display rack by a customer is larger than the amount of display before the good placed on the display rack based on the transition of the amount of display, and
  the processor generates a control signal causing an output device to output information indicating a possibility that a different good has been placed.

\* \* \* \* \*